United States Patent
Min et al.

(10) Patent No.: US 10,599,469 B2
(45) Date of Patent: Mar. 24, 2020

(54) METHODS TO PRESENT THE CONTEXT OF VIRTUAL ASSISTANT CONVERSATION

(71) Applicant: MOTOROLA MOBILITY LLC, Chicago, IL (US)

(72) Inventors: Jun-Ki Min, Chicago, IL (US); David A. Schwarz, Morrisville, NC (US); Krishna C. Garikipati, Chicago, IL (US); John W. Nicholson, Cary, NC (US); Mir Farooq Ali, Rolling Meadows, IL (US)

(73) Assignee: Motorola Mobility LLC, Chicago, IL (US)

( * ) Notice: Subject to any disclaimer, the term of this patent is extended or adjusted under 35 U.S.C. 154(b) by 166 days.

(21) Appl. No.: 15/884,301

(22) Filed: Jan. 30, 2018

(65) Prior Publication Data

US 2019/0235916 A1 Aug. 1, 2019

(51) Int. Cl.
| | |
|---|---|
| *G06F 9/48* | (2006.01) |
| *G06F 3/0481* | (2013.01) |
| *G06F 3/048* | (2013.01) |
| *G06F 3/0484* | (2013.01) |
| *G06F 9/451* | (2018.01) |
| *G06Q 10/10* | (2012.01) |
| *H04M 3/527* | (2006.01) |

(52) U.S. Cl.
CPC ............ *G06F 9/4843* (2013.01); *G06F 3/048* (2013.01); *G06F 3/0481* (2013.01); *G06F 3/0484* (2013.01); *G06F 9/453* (2018.02); *G06F 9/485* (2013.01); *G06Q 10/109* (2013.01); *H04M 3/527* (2013.01)

(58) Field of Classification Search
None
See application file for complete search history.

(56) References Cited

U.S. PATENT DOCUMENTS

| | | | |
|---|---|---|---|
| 10,055,681 B2* | 8/2018 | Brown | G06N 3/008 |
| 2014/0040748 A1* | 2/2014 | Lemay | G06F 3/167 |
| | | | 715/728 |
| 2015/0186156 A1* | 7/2015 | Brown | G06F 3/04817 |
| | | | 715/706 |

* cited by examiner

*Primary Examiner* — Qing Yuan Wu
(74) *Attorney, Agent, or Firm* — Yudell Isidore PLLC

(57) ABSTRACT

A method, a system, and a computer program product for indicating a dialogue status of a conversation thread between a user of an electronic device and a virtual assistant capable of maintaining conversational context of multiple threads at a time. The method includes receiving, at an electronic device providing functionality of a virtual assistant (VA), a user input that corresponds to a task to be performed by the VA. The method includes determining, from among a plurality of selectable threads being concurrently maintained by the VA and based on content of the user input, one target thread to which the user input is associated. The method includes performing the task within the target thread.

20 Claims, 9 Drawing Sheets

METHODS TO PRESENT THE CONTEXT OF VIRTUAL ASSISTANT CONVERSATION

BACKGROUND

1. Technical Field

The present disclosure generally relates to electronic devices providing virtual assistant functionalities and in particular to a method for presenting the context of virtual assistant conversation.

2. Description of the Related Art

Virtual assistants are software applications that understand natural language and complete electronic tasks in response to user inputs. For example, virtual assistants take dictation, read a text message or an e-mail message, look up phone numbers, place calls, and generate reminders.

A virtual assistant (VA) application keeps contextual information associated with a most recent user-initiated query and engages in a single dialogue related to that most recent user-initiated query. For example, once a user has asked a question to the VA about a specific location (e.g., "What is the weather in Chicago?"), then the user can ask a follow-up question (e.g., "What about on this weekend?") about that specific location without stating the name of the specific location (e.g., without stating the name "Chicago") again. In this example, the VA may respond to the previous user-initiated query by providing a weekday/today weather forecast for the specific location, and the VA may respond to the subsequent user-initiated query, which is associated with the previous user-initiated query, by providing the weekend weather forecast for the specific location. To enable this subsequent response, the VA keeps the specific location (e.g., Chicago) as contextual information associated with the previous user-initiated query, and maintains dialogue regarding the kept contextual information (e.g., Chicago as the specific location) by providing both responses within the same ongoing conversation. When the user of the VA (e.g., a person) changes topics by presenting a non-related query to the VA, the VA discards the previous context and begins the process of maintaining a new context. Currently there is no indication provided to the user that the VA is storing the current context for processing subsequent queries, and so the user often will present the contextual information as a part of the next query presented to the VA. Also, currently, there is no mechanism or methodology for the VA to maintain more than a single set of a most recent contextual data when the user switches to a new context. A user cannot present an un-related query that triggers the VA to maintain a new set of contextual data, and subsequently attempt to re-engage with the VA about the previous context. Each switch, by the user, requires the VA to start over with maintaining information about the most recent/current context.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
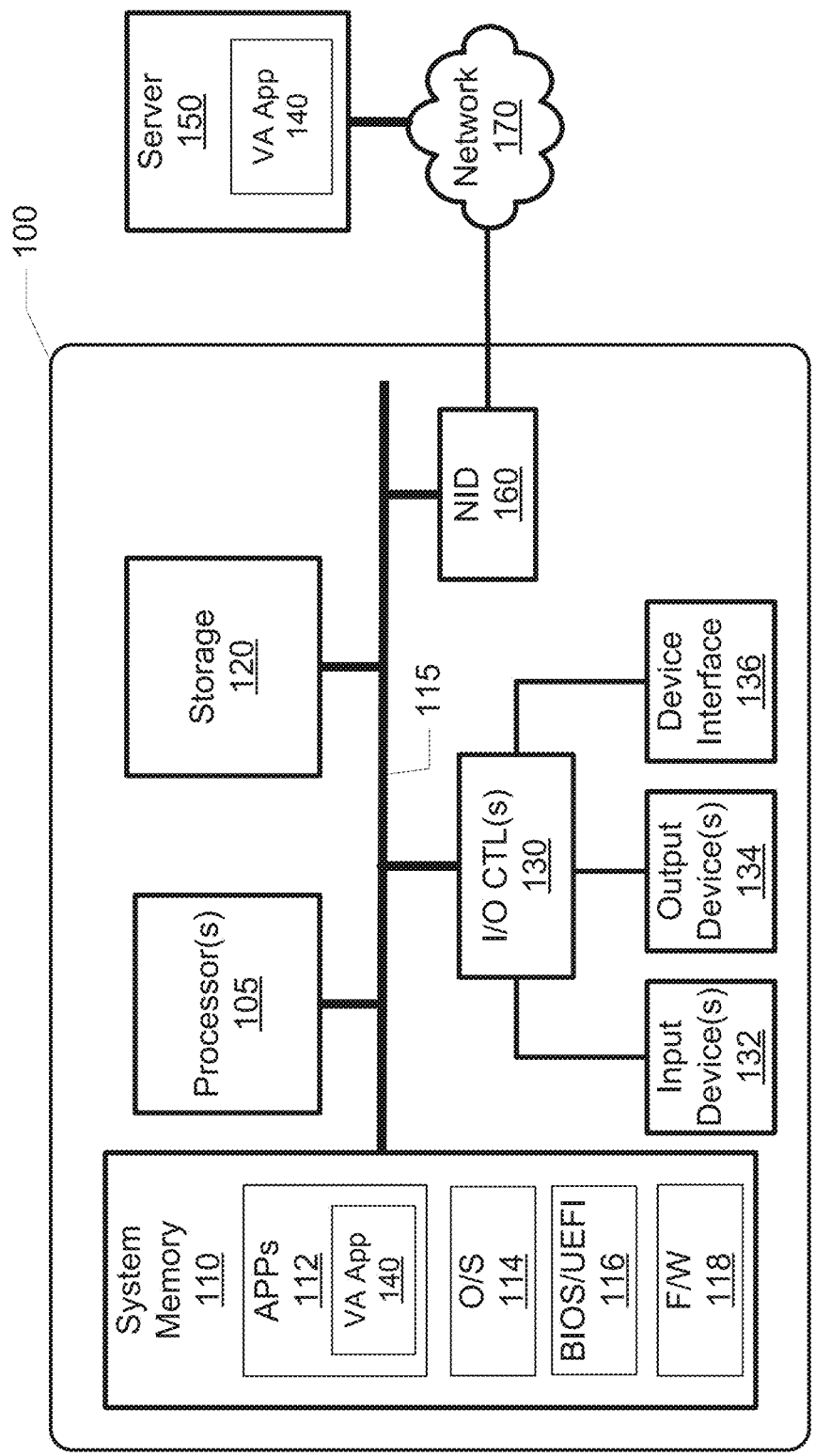
FIG. 1 provides a block diagram representation of an example data processing system within which certain aspects of the disclosure can be practiced, in accordance with one or more embodiments of this disclosure.

Disclosed are a method, an electronic device, and a computer program product for indicating a dialogue status of a conversation thread between a user of an electronic device and a virtual assistant (VA) capable of maintaining conversational context of multiple threads at a time. According to one embodiment, a method includes receiving, at an electronic device providing functionality of a VA, a user input that corresponds to a task to be performed by the VA. The method includes determining, from among a plurality of selectable threads and based on content of the user input, one target thread to which the user input is associated. The method includes performing the task within the target thread.

According to another embodiment, a data processing system includes an input device that receives user input, an output device that outputs human detectable cues, and a processor that is operably coupled to the input device and output device. The processor executes program code enabling the data processing system to receive, at an electronic device providing functionality of a VA, a user input that corresponds to a task to be performed by the VA. The processor executes program code enabling the data processing system to determine, from among a plurality of selectable threads and based on content of the user input, one target thread to which the user input is associated. The processor executes program code enabling the data processing system to perform the task within the target thread. The processor also executes program code that enables the device to output, via an output device, a human detectable cue for each conversation thread (i.e., of a dialogue between the user and the VA) for which the VA maintains contextual information.

In the following description, specific example embodiments in which the disclosure may be practiced are described in sufficient detail to enable those skilled in the art to practice the disclosed embodiments. For example, specific details such as specific method sequences, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "alternate embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the presented devices are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 illustrates a block diagram representation of a data processing device, for example data processing system (DPS) 100, within which one or more of the described features of the various embodiments of the disclosure can be implemented. For example, a data processing system may be a handheld device, personal computer, a server, a network storage device, or any other suitable device and may vary in size, shape, performance, functionality, and price.

Referring specifically to FIG. 1, example DPS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown).

In one embodiment, storage 120 can be a hard drive or a solid-state drive. The one or more software and/or firmware modules within storage 120 can be loaded into system memory 110 during operation of DPS 100. The various software and/or firmware modules have varying functionality when their corresponding program code is executed by processor(s) 105 or other processing devices within DPS 100.

As shown, system memory 110 can include therein a plurality of software and/or firmware modules including application(s) 112, operating system (O/S) 114, basic input/output system/unified extensible firmware interface (BIOS/UEFI) 116 and other firmware (F/W) 118.

DPS 100 also includes VA application 140. VA application 140 may be provided as an application that is optionally located within the system memory 110 and executed by processor 105. Within this embodiment, processor 105 executes VA application 140 to provide the various methods and functions described herein. VA application 140 performs the functions of a virtual assistant, and for simplicity, VA application 140 may be referred to as simply VA 140. It is, however, understood that processor 105 executes VA application 140 to provide the various methods and functions described herein. For simplicity, VA 140 is illustrated and described as a stand-alone or separate software/firmware/logic component, which provides the specific functions and methods described herein. However, in at least one embodiment, VA 140 may be a component of, may be combined with, or may be incorporated within OS 114, and/or with one or more applications 112. Additional aspects of VA 140, and functionality thereof, are presented within the description of FIGS. 2-7. In certain embodiments, VA 140 is also stored, or alternatively stored within a server 150 and executed by a processor associated with server 150. According to various embodiments of this disclosure, VA 140 could be an independent application, a system application, or a part of the system itself. In certain embodiments, VA 140 includes an application programming interface (API) that enables the system to interact with VA 140 to set or restore a previous status of VA 140 and threads maintained by VA 140. For example, at a previous time, a communication session between a user and VA 140 may include ten (10) conversation threads that respectively have ten (10) statuses stored in system memory 110 or in storage 120. Later, in the event that statuses of the conversation threads need to be set or restored, the API of VA 140 enables the system to interact with VA 140 to set the current status of VA 140 to have the same status had (stored in system memory 110 or in storage 120) at the previous time, namely, by setting the statuses of ten (10) conversation threads to the current status of VA 140.

DPS 100 further includes one or more input/output (I/O) controllers 130, which support connection by, and processing of signals from, one or more connected input device(s) 132, such as a keyboard, mouse, touch screen, or microphone. I/O controllers 130 also support connection to and forwarding of output signals to one or more connected output devices 134, such as a display, audio speaker(s), or a set of light emitting diodes (LEDs). Additionally, in one or more embodiments, one or more device interface(s) 136, such as an optical reader, a universal serial bus (USB), a card reader, Personal Computer Memory Card International Association (PCMIA) slot, and/or a high-definition multimedia interface (HDMI), can be coupled to I/O controllers 130 or otherwise associated with DPS 100. Device interface(s) 136 can be utilized to enable data to be read from or stored to additional devices (not shown) for example a compact disk (CD), digital video disk (DVD), flash drive, or flash memory card. In one or more embodiments, device interface(s) 136 can further include General Purpose I/O interfaces, such as an Inter-Integrated Circuit (I²C) Bus, System Management Bus (SMBus), and peripheral component interconnect (PCI) buses.

DPS 100 further comprises a network interface device (NID) 160. NID 160 enables DPS 100 to communicate and/or interface with other devices, services, and components that are located external (remote) to DPS 100, for example, server 150, other devices, via a communication network. These devices, services, and components can interface with DPS 100 via an external network, such as example network 170, using one or more communication protocols. Network 170 can be a local area network, wide area network, personal area network, signal communication network, and the like, and the connection to and/or between network 170 and DPS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

Figure 2:
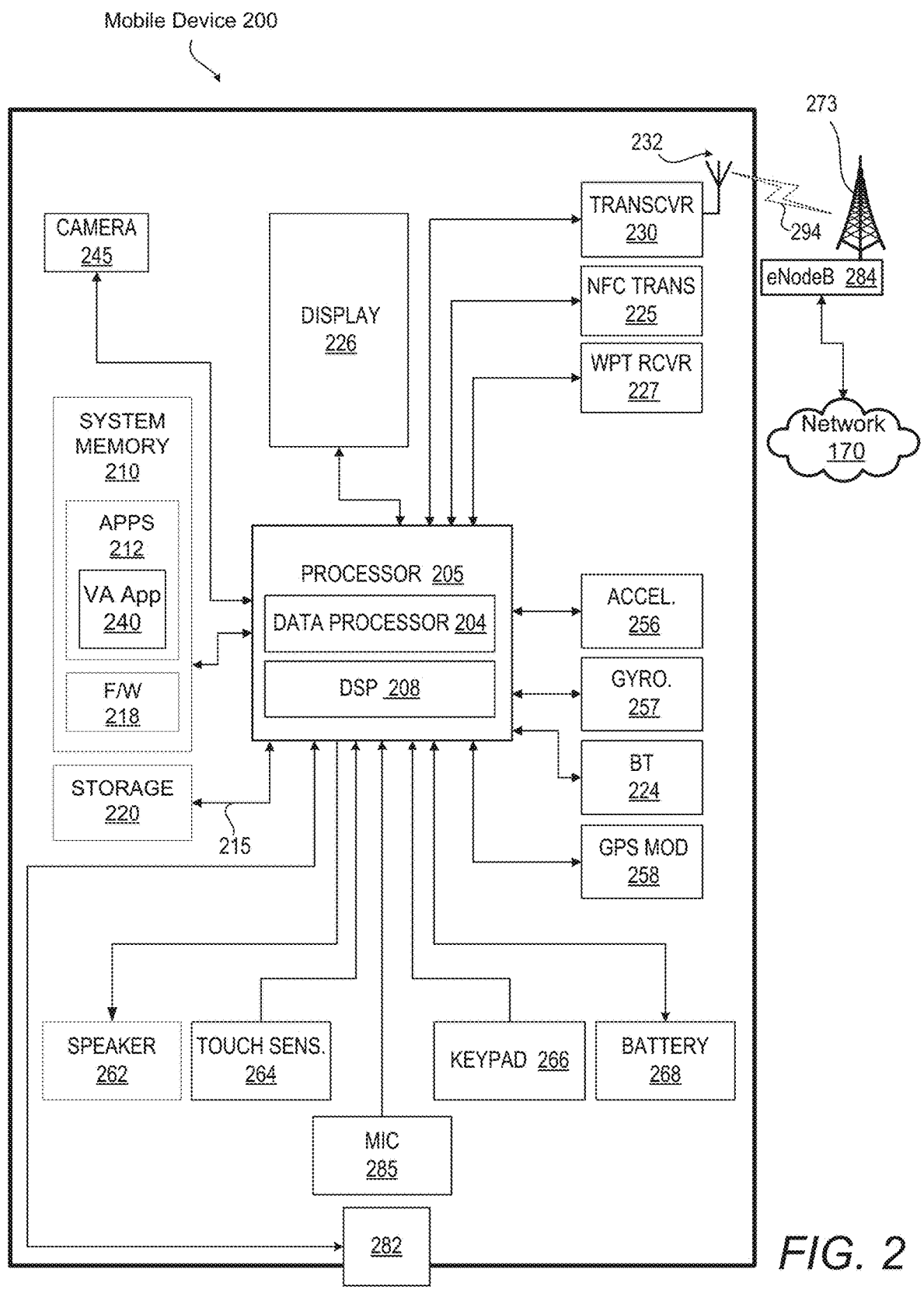
FIG. 2 illustrates a mobile device within which certain aspects of the disclosure can be practiced, in accordance with one or more embodiments of this disclosure.

In the description of the following figures, reference is also occasionally made to specific components illustrated within the preceding figures, utilizing the same reference numbers from the earlier figures. With reference now to FIG. 2, there is illustrated example mobile device 200. The embodiment of mobile device 200 illustrated in FIG. 2 is for illustration only, and DPS 100 of FIG. 1 could have the same or similar configuration. Mobile device 200 includes at least one processor integrated circuit, processor 205. Included within processor 205 are data processor 204 and digital signal processor (DSP) 208. Processor 205 is coupled to system memory 210 and non-volatile storage 220 via a system communication mechanism, such as system interconnect 215. System interconnect 215 can be interchangeably referred to as a system bus, in one or more embodiments. One or more software and/or firmware modules can be loaded into system memory 210 during operation of mobile device 200. Specifically, in one embodiment, system memory 210 can include therein a plurality of such modules, including firmware (F/W) 218. System memory 210 may also include basic input/output system and an operating system (not shown). The software and/or firmware modules provide varying functionality when their corresponding program code is executed by processor 205 or by secondary processing devices within mobile device 200.

Processor 205 supports connection by and processing of signals from one or more connected input devices such as camera 245, speaker 262, touch sensor 264, microphone 285, keypad 266, and display 226. Additionally, in one or more embodiments, one or more device interfaces 282, such as an optical reader, a universal serial bus (USB), a card reader, Personal Computer Memory Card International Association (PCMIA) slot, and/or a high-definition multimedia interface (HDMI), can be associated with mobile device 200. Mobile device 200 also contains a power source such as a battery 268 that supplies power to mobile device 200.

Mobile device 200 further includes Bluetooth transceiver 224, global positioning system module (GPS MOD) 258, gyroscope 257, and accelerometer 256, all of which are communicatively coupled to processor 205. Bluetooth transceiver 224 enables mobile device 200 and/or components within mobile device 200 to communicate and/or interface with other devices, services, and components that are located external to mobile device 200. GPS MOD 258 enables mobile device 200 to communicate and/or interface with other devices, services, and components to send and/or receive geographic position information. Gyroscope 257 communicates the angular position of mobile device 200 using gravity to help determine orientation. Accelerometer 256 is utilized to measure non-gravitational acceleration and enables processor 205 to determine velocity and other measurements associated with the quantified physical movement of a user.

Mobile device 200 is presented as a wireless communication device. As a wireless device, mobile device 200 can transmit data over wireless network 170. Mobile device 200 includes transceiver 230, which is communicatively coupled to processor 205 and to antenna 232. Transceiver 230 allows for wide-area or local wireless communication, via wireless signal 294, between mobile device 200 and evolved node B (eNodeB) 284, which includes antenna 273. Mobile device 200 is capable of wide-area or local wireless communication with other mobile wireless devices or with eNodeB 284 as a part of a wireless communication network. Mobile device 200 communicates with other mobile wireless devices by utilizing a communication path involving transceiver 230, antenna 232, wireless signal 294, antenna 273, and eNodeB 284. Mobile device 200 additionally includes near field communication transceiver (NFC TRANS) 225 wireless power transfer receiver (WPT RCVR) 227. In one embodiment, other devices within mobile device 200 utilize antenna 232 to send and/or receive signals in the form of radio waves. For example, GPS module 258 can be communicatively coupled to antenna 232 to send/and receive location data.

As provided by FIG. 2, mobile device 200 additionally includes VA application 240. VA application 240 may be provided as an application that is optionally located within the system memory 210 and executed by processor 205. Within this embodiment, processor 205 executes VA application 240 to provide the various methods and functions described herein. VA application 240 performs the functions of a virtual assistant, and for simplicity, VA application 240 may be referred to as simply VA 240. It is, however, understood that processor 205 executes VA application 240 to provide the various methods and functions described herein. In at least one embodiment, VA 240 may be a component of, may be combined with, or may be incorporated within one or more applications 212.

Figure 3B:
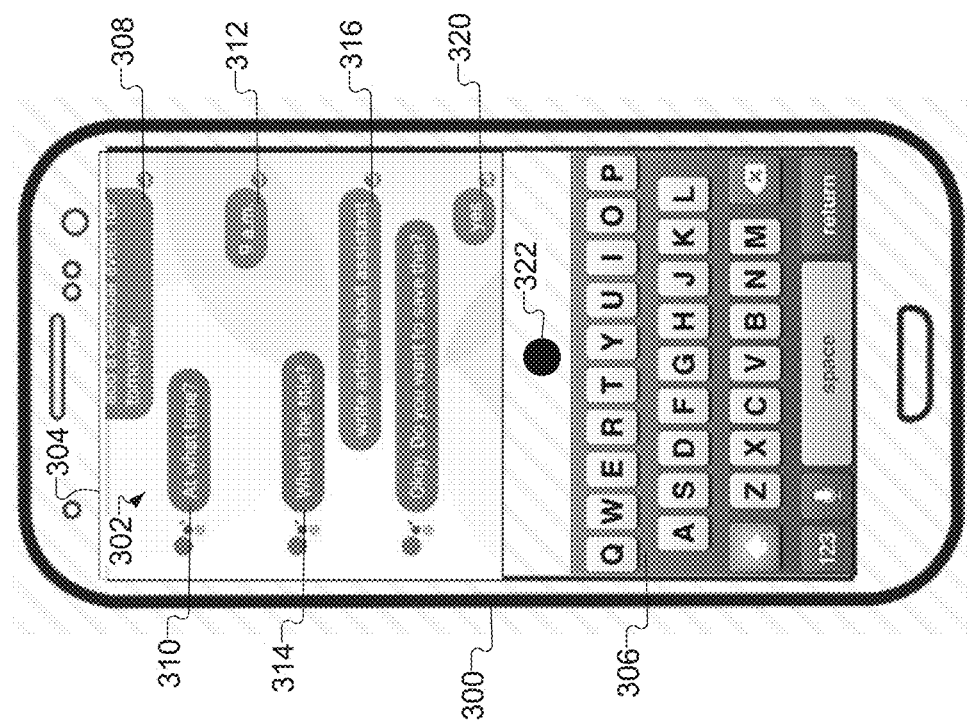
FIG. 3B illustrates the mobile device of FIG. 3A presenting a visual indicator that informs a user that the VA is maintaining/storing contextual information of a dialogue between the VA and the user, in accordance with one or more embodiments of this disclosure.
Figure 3A:
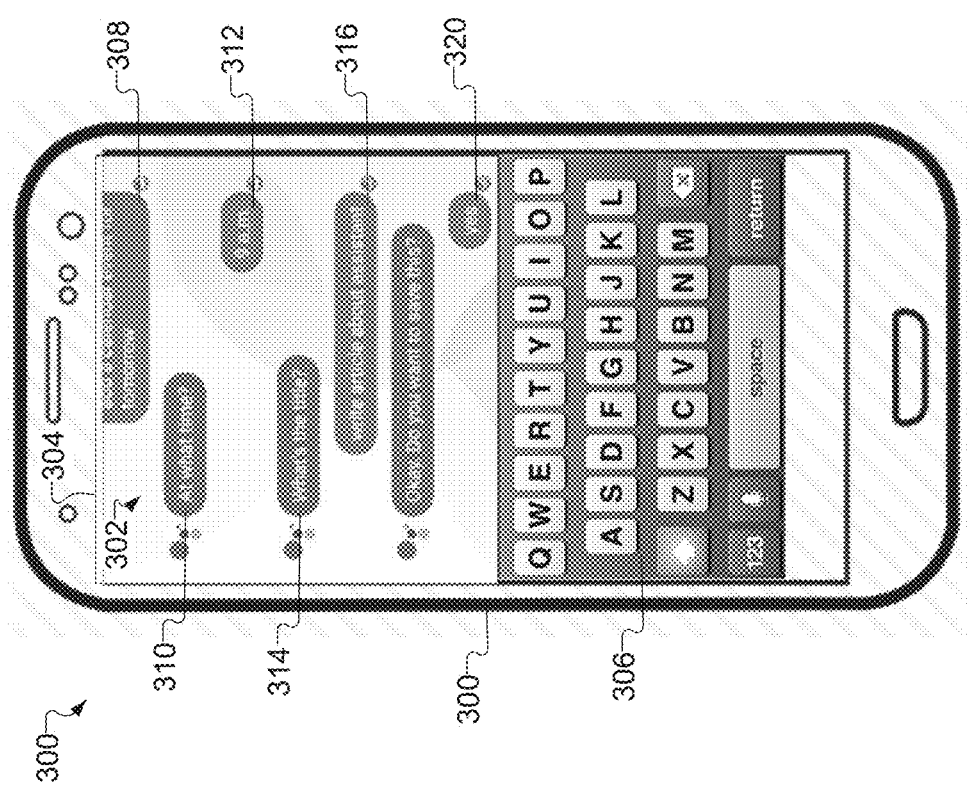
FIG. 3A illustrates a mobile device displaying a dialogue between a user and a virtual assistant (VA) capable of maintaining conversational context of only one thread at a time, in accordance with one or more embodiments of this disclosure.

With reference now to FIG. 3A, there is illustrated a mobile device 300 displaying a dialogue 302 between a user and a VA application, such as VA 240, communicating as a VA capable of maintaining conversational context of only one thread at a time, in accordance with one or more embodiments of this disclosure. The electronic touch display 304 of the mobile device 300 can display dialogue 302 together with a keypad 306. Keypad 306 provides an input interface for receiving user input.

In the example dialogue 302 shown, mobile device 300 receives a user input 308 (e.g., "add a calendar event for tomorrow") through an input interface, such as the keypad 306. User input 308 can be text data that is written or typed, or can be audio data (i.e., a spoken voice).

In response to receiving the user input 308, the mobile device 300 processes the user input 308 to determine a user-initiated task-request. The user-initiated task-request corresponds to a task to be performed by the VA 240. When the task to be performed by the VA is to query a data source (e.g., database), the user-initiated task-request can be referred to as a user-initiated query. Processing the user input 308 may include performing, by VA 240, natural language processing on the user input 308, which may include converting audio data into text data using automatic speech recognition (ASR). The natural language processing performed by VA 240 may also include using techniques to convert text data into a semantic representation that allows the VA 240 to understand the user input 308, such as by matching one or more parts of the user input 308 to predetermined tasks (e.g., "Add a calendar event," "Add a new contact," and the like) in order to ascertain the subject matter of the task. The natural language processing performed by VA 240 may also include using techniques to convert text data into a semantic representation that allows the VA 240 to understand the user input 308, such as by matching one or more parts of the user input 308 to predetermined queries (e.g., "Where is the nearest gas station?", "What is the weather like tomorrow?", and the like) in order to ascertain the subject matter of the query. Processing the user input 308 may include the VA 240 accessing contextual information that provides context for the received user input 308. For example, when the user input is "What is the weather like tomorrow," the VA 240 accesses contextual information associated with the received user input to identify the location associated the weather request, and the VA 240 may determine a user-initiated query (e.g., "What is the weather like tomorrow for Chicago, Ill.?") associated with the current GPS location of the mobile device 300. As another example, when the user input 308 is "add a calendar event for tomorrow," the VA 240 may determine a user-initiated task-request (e.g., add calendar event), and further determine that additional information needs to be input from the user, in order to perform the task.

After processing the query, mobile device 300 generates a response to the user-initiated query or user-initiated task-request. Generating a response to the user-initiated task-request/query includes accessing one or more data sources. For example, when the VA 240 determines that the user-initiated query is "What is the weather like tomorrow for Chicago, Ill.," the VA 240 accesses a data source that stores weather information for Chicago, Ill. As another example, generating a response to the user-initiated task-request includes populating a set of fields, and prompting a user to input additional information corresponding to empty fields within the set of fields. For example, when the user-initiated task-request is to add a calendar event, the VA 240 may populate a set of fields including a date, start time, and title of the calendar event. When the user input 308 only includes date information, the VA 240 may generate a response 310 (e.g., "At what time?") that prompts the user to provide additional information corresponding to an empty start time field, and a response 314 (e.g., "What's the title?") that prompts the user to provide additional information corresponding to an empty title field.

Mobile device 300 outputs generated response 310 through an output device (e.g., electronic touch display 304 of FIG. 3A-3B, speaker 262, and/or display 226 of FIG. 2). In certain embodiments, outputting the response 310 includes displaying text data or graphical data through a display. In certain embodiments, outputting the response 310 includes converting the response 308 into audio data for output through a speaker (e.g., using a text-to-speech software application).

In the example dialogue 302 shown, the mobile device 300 receives subsequent user input 312 (e.g., "9 a.m."), 316 (e.g., "write article about assistant") in the same conversation thread as the previous user input 308 and the VA 240 response 310 based on the previous user input 308. If the user tries to change the subject matter of the conversation thread, for example by providing a subsequent user input that has as a subject matter dissimilar from the previous user input 308, then the VA 240 will automatically discard the entire conversation thread (including contextual information) having the subject matter of the previous user input 308 and start a new conversation thread having the subject matter of the subsequent user input. Once the contextual information of a conversation thread is discarded, the user cannot resume the conversation thread and cannot ask follow-up questions. In some instances, if the user provides a subsequent user input that has a subject matter dissimilar from the previous user input 308, then the VA 240 will get confused and notify the user that the VA 240 cannot process the information within the subsequent user input.

With reference now to FIG. 3B, according to one aspect, there is illustrated an improved mobile device outputting an indicator 322 that identifies to the user that the VA 240 is maintaining (e.g., storing) contextual information of a dialogue between the VA 240 and the user, in accordance with one or more embodiments of this disclosure. More particularly, contextual information of the dialogue 302 is maintained by the VA 240, and the indicator 322 is controlled by the VA 240 to indicate whether or not the contextual information is being maintained by the VA 240. The indicator 322 is perceptible to the user as a notification that the VA 240 is maintaining contextual information of previous user input 308 of the dialogue 302 and is listening for or otherwise ready to receive and perform the task of a subsequent user-initiated task-request 312, without discarding the contextual information of previous user input(s) 308. More particularly, regarding a series of user-initiated tasks in the dialogue 302, the indicator 322 can notify the user that the VA 240 is maintaining contextual information of an accumulated set of previous user inputs 308 and 312 and is listening for a task of a subsequent user-initiated task-request 316. For example, the indicator 322 notifies the user that the user can input a follow-up statement (e.g., "Notify me 15 minutes ahead of time" or "Make it happen at my office") about previous contextual information of the dialogue 302, such as "tomorrow," the title "write article about assistant," or the time "9 a.m.," without saying any of these phrases again.

Figure 4A:
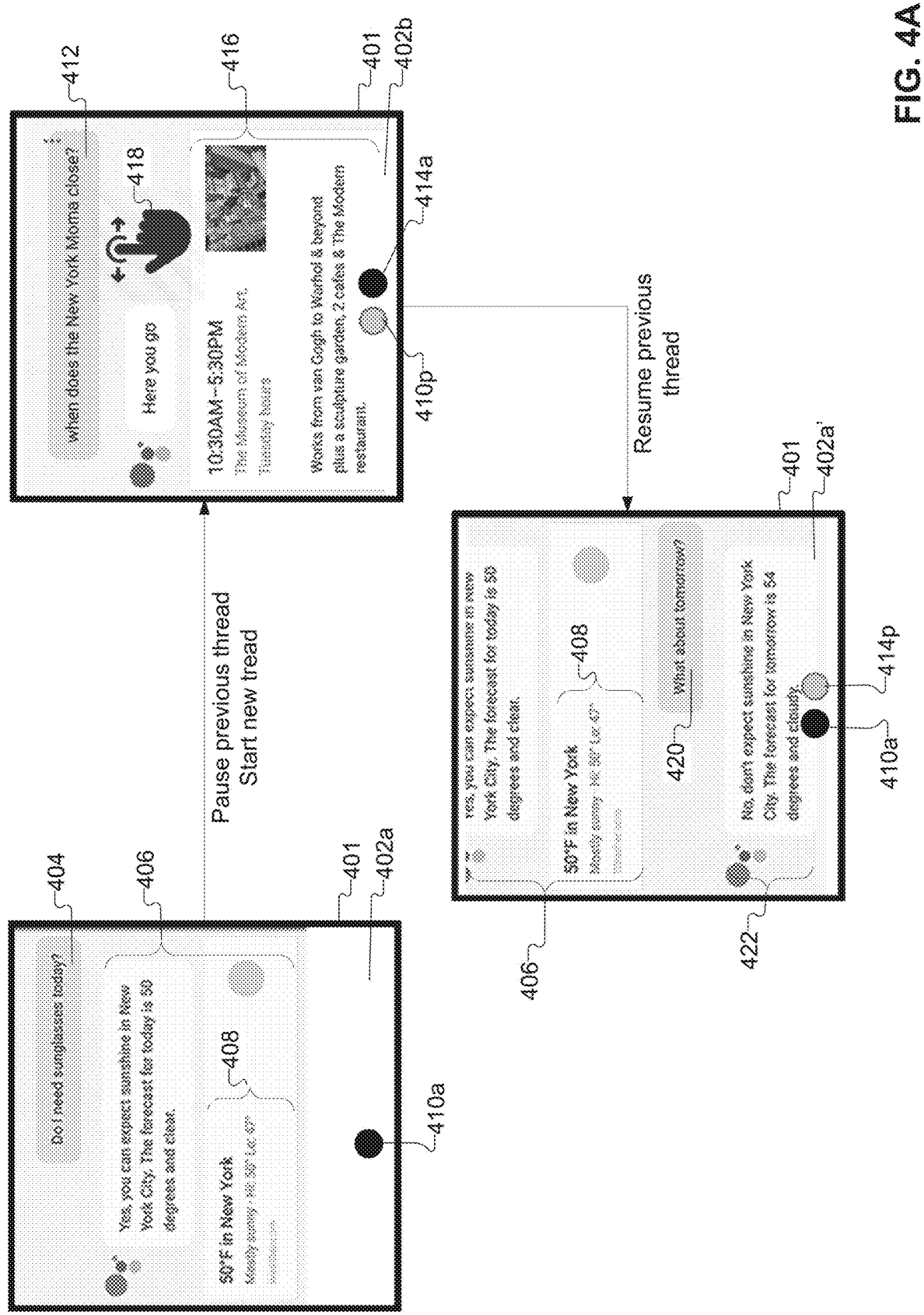
FIG. 4 (4A and 4B) provides examples of selectable-screens of a graphical user interface of a mobile device that each display a separate dialogue between a user and a VA capable of maintaining conversational context of multiple threads at a time, in accordance with one or more embodiments of this disclosure.

With reference now to FIG. 4A, there is illustrated examples of selectable-screens of a graphical user interface (GUI) 401 of a mobile device (e.g., mobile device 200). Each selectable-screen of GUI 401 displays a dialogue between a user and a VA 240 capable of maintaining conversational context of multiple threads at a time, in accordance with one or more embodiments of this disclosure. For simplicity, GUI 401 of FIG. 4A is presented by the mobile device 200 of FIG. 2, yet it is understood that GUI 401 can be presented by any suitable DPS. GUI 401 includes one screen per conversation thread that is maintained between the user and VA 240. When the dialogue between the user and the VA causes the VA 240 to maintain only one conversation thread, the GUI 401 includes only one screen (e.g., first screen 402a). While the first screen 402a is displayed, no selection of a thread can be made by the user because only the first thread is maintained by the VA 240. When the dialogue between the user and the VA causes the VA 240 to maintain multiple threads at a time, the GUI 401 includes one selectable-screen per conversation thread that is maintained (i.e., a different selectable-screen for each conversation thread). Note the phrase "selectable-screen" in this disclosure indicates that the VA 240 is maintaining multiple conversation threads at the same time (e.g., concurrently), and correspondingly, that the user can interact with GUI 401 to select from among the multiple selectable-screens. For example, three screens are shown in FIG. 4A, namely, first screen 402a, first selectable-screen 402a', and second selectable-screen 402b. The second selectable-screen 402b displays the dialogue between the user and VA in association with a second conversation thread, and the first selectable-screen 402a' displays the continued dialogue between the user and VA in association with a first conversation thread.

In the example shown, a conversational dialogue between the user and the VA begins with user input 404, in which the user asks "Do I need sunglasses today?" GUI 401 displays the user input 404 as a text message bubble in a first screen 402a.

The VA 240 processes the user input 404 to determine a user-initiated task-request. Processing the user input 404 can include natural language processing, which can include matching one or more parts of the user input 404 to key phrases that indicate to the VA 240 the task to be performed. For example, the task to be performed can be switching threads (described below with reference to first sub-input 519 of FIG. 5), or closing a thread (described below with reference to block 610 of FIG. 6). Example key phrases that indicate to the VA 240 that the task is switching threads include: "Hold on," "Pause," "Back to . . . ," "Ask more about . . . ," "Follow-up questions . . . ," "Resume . . . " and the like. Example thread finisher key phrases that indicate to the VA 240 that the task is closing the target thread include: "Finish the talk . . . ," "End the conversation" and the like. The content of the user input 404 provides the subject matter of the user-initiated task-request. For example, the phrase "need sunglasses" in the content of the user input 404 could provide the subject matter of a weather request. For example, a specific weather request could query for a meteorological sky cover (e.g., mostly sunny) category. The VA 240 can access the current GPS location of the mobile device 200 via GPS MOD 258, and in doing so, the VA 240 accesses contextual information associated with the received user input 404 to identify the location associated with the weather request. The VA 240 may determine a user-initiated task-request (e.g., "Can you expect sunshine in New York City today?") associated with the identified location that is associated with the weather request. In this example, only one user-initiated task-request was determined from the user input 404, and consequently, the conversation dialogue between the user and VA includes only one conversation thread at this instance.

The VA 240 determines, based on the determined user-initiated task-request, a "target thread" to which the user input 404 is associated. The target thread is the sole conversation thread within which the VA 240 will perform the task requested via the user-initiated task-request. When the dialogue between the user and VA consists of only an initial user input 404, then the VA 240 determines that the user-initiated task-request is associated with a first conversation thread, which is the only conversation thread maintained. Accordingly, the first conversation thread is determined as the target thread. In the example shown, the VA 240 establishes that the task of responding to "Can you expect sunshine in New York City today?" (i.e., user-initiated task-request) will occur within the first conversation thread as the target thread.

The VA 240 generates a response to the determined user-initiated task-request by accessing a data source that stores weather information for New York City, N.Y. The generated response 406 is displayed in the first screen 402a of the GUI 401. The response 406 could include the data source 408 (e.g., Weather.com, 50° F. in New York, Mostly sunny • Hi: 50° Lo: 47°) accessed in the generation of the response 406. When the dialogue between the user and VA consists of only one conversation thread, then the GUI 401 includes only one screen, and that one screen of the GUI 401 displays response 406. Also, when the dialogue between the user and VA consists of only one conversation thread, then that one conversation thread is an "active thread." The active thread is the conversation thread that is being presented (e.g., displayed via the GUI 401) to the user at any point in time. That is, even when the dialogue between the user and VA includes multiple conversation threads at one time, only one thread from among the multiple threads can be the "active thread" at any point in time. The other threads can thus be referred to as inactive threads, which are not currently displayed on the GUI, but are available for selection as the active thread, based on the received user input.

In the first screen 402a, the mobile device 200 additionally outputs a first visual cue 410a, which is a human-detectable cue corresponding to the first conversation thread. The first visual cue 410a indicates a dialogue status of the conversation between the user and the VA. More particularly, each conversation thread has its own dialog status. For each individual conversation thread, the dialogue status indicates whether the VA 240 has kept or discarded the contextual information from previous user-initiated task-requests of that particular conversation thread. For example, while the VA 240 keeps contextual information of the first conversation thread, the human detectable cue corresponding to the first conversation thread will be displayed via the GUI 401, namely, the GUI 401 will display the first visual cue 410*a*. However, once the VA 240 discards the contextual information of the first conversation thread, the GUI 401 will no longer display the first visual cue 410*a*. Examples of contextual information of the first conversation thread that may be kept by the VA 240 include location as New York City, subject matter as weather, subject matter as meteorological sky cover, and date as today.

In addition to the presence or absence of a human-detectable cue as an indicator of whether contextual information of the thread is kept or discarded, the characteristics (e.g., color, shape, flashing) of the human-detectable cue indicate whether the VA is in or out of that particular conversation thread. In the example shown in the first screen 402*a*, the first visual cue 410*a* is a yellow dot to indicate that the VA is in the first conversation thread. With this example, a different colored dot can then indicate the inactive threads. In some embodiments, the VA can only be in one conversation thread at a time, and consequently, the "active thread" is the thread that the VA is currently listening in. Different characteristics of a human-detectable cue can be used to indicate that a conversation thread is in a paused state (also referred to as a deactivated state). When a particular thread is in the paused state, the VA 240 both maintains the contextual information for that particular conversation thread and is out of (i.e., not in a listening mode of) that particular conversation thread. For example, in a paused state, the human-detectable cue can be a gray dot, which is visually distinct from a yellow dot.

After the VA 240 performs the task within the target thread (namely, by displaying the response 406 in the same conversation thread as the user input 404), the VA 240 maintains the contextual information of the first thread, and the mobile device 200 receives a subsequent user input 412 (herein referred to as "second user input") (e.g., "when does the New York MOMA close?"). In response, the VA 240 processes the second user input 412 to determine a user-initiated task-request (e.g., "What are today's operating hours for The Museum of Modern Art in New York City?").

The VA 240 determines, based on the user-initiated task-request, a "target thread" to which the second user input 412 is associated. More particularly, based on the content of the second user input 412, the VA 240 determines that second user input 412 (and the user-initiated task request determined based on the second user input 412) is associated with a new second conversation thread as the target thread. Thus, VA 240 generates the new second conversation thread. At this instance, the VA 240 maintains contextual information for multiple threads—the first conversation thread and the second conversation thread.

The VA 240 identifies the first conversation thread as the active thread based on a determination that the first screen 402*a* is currently presented via the GUI 401. In response to identifying that the target thread (namely, second conversation thread) is not the active thread (namely, the first conversation thread), the VA 240 places the first thread into a paused state and activates the second conversation thread as the active thread. More particularly, the VA 240 causes the mobile device 200 to stop displaying the first screen 402*a* and to instead display the second selectable-screen 402*b*. The VA 240 causes the mobile device 200 to display the second user input 412 in a textual format (e.g., as a text message bubble) in a second selectable-screen 402*b* of the GUI 401. Within the GUI 401, in addition to changing the first visual cue 410*a* from a yellow color within the first screen 402*a* to a grey color of the first visual cue 410*p* within the second selectable-screen 402*b*, wherein the gray dot indicates the paused state of the first thread, the mobile device 200 additionally outputs a yellow dot within the second selectable-screen 402*b* as a second visual cue 414*a*, which is a human-detectable cue, corresponding to the second conversation thread being the active thread.

The VA 240 generates a response to the determined user-initiated task-request by accessing a data source that stores operating hours for The Museum of Modern Art in New York City. The VA 240 performs the task of responding to "What are today's operating hours for The Museum of Modern Art in New York City?" (i.e., user-initiated task-request) within the second conversation thread as the target thread.

Also, the VA 240 causes the mobile device 200 to present the result 416 of the performance of the task in the second selectable-screen 402*b*, thereby presenting the result 416 in association with the second conversation thread as both the active thread and the target thread.

After the VA 240 performs the task within the target thread (namely, by displaying the result 416 in the same conversation thread as the second user input 412), the VA 240 continues to maintain the contextual information of the first and second threads, and the mobile device 200 receives a third user input 418, such as a gesture (e.g., swipe) on the second selectable-screen 402*b* or a touch on the first visual cue 410*p* (i.e., gray dot). The third user input 418 indicates, to the VA 240, a user-initiated task-request for switching threads. That is, the third user input 418 is a selection input that does not require natural language processing that is executed for content-based user input. Performance of a "switching threads" task means switching the dialogue status of "active thread" from one thread to another thread by placing the active thread into a paused state and activating another (target) thread as the active thread. In the example shown, switching threads includes switching from the second thread to the first thread based on a determination that the second thread is the active thread to be placed in a paused state according to the switching threads task selected via the third user input 418. For example, if the third user input 418 is a touch on the first visual cue 410*p*, then the third user input 418 identifies the first thread as a specific other thread within which the VA 240 will perform a next task. As another example, in instances during which the VA 240 maintains more than two conversation threads at one time, a swipe left could indicate switching to a previous thread, and a swipe right could indicate switching to a next thread.

The VA 240 identifies the second conversation thread as the active thread based on a determination that the second selectable-screen 402*b* is currently presented via the GUI 401. In response to identifying that the first thread is the specific other thread, the VA 240 places the second thread into a paused state and reactivates the first thread as the active thread. More particularly, the VA 240 causes the mobile device 200 to stop displaying the second selectable-screen 402*b* and to instead display the first selectable-screen 402*a'*. Within the first selectable-screen 402*a'*, the mobile device 200 outputs (or modifies the color of) the second visual cue 414*p* as a gray dot that indicates the paused state of the second thread. Additionally, the mobile device 200 outputs a first visual cue 410*a* (e.g., a yellow dot), which corresponds to the first conversation thread being the currently active thread.

After performing the switching of the threads, the mobile device 200 receives a fourth user input 420 (e.g., "What about tomorrow?") in the first thread. The VA 240 identifies that the fourth user input 420 is associated with the first thread, and causes the mobile device 200 to display the user input 420 as a text message bubble in a first selectable-screen 402a' of the GUI 401.

In response to receiving the fourth user input 420, the VA 240 processes the fourth user input 420 and associates the fourth user input 420 with a user-initiated task-request that is understood by and can be acted upon by the VA 240 within the context of the first thread (e.g., "Can you expect sunshine in New York City tomorrow?"). The VA 240 generates a response to the associated user-initiated task-request by accessing a data source that stores weather information for New York City, N.Y. The VA 240 thus responds to receipt of the fourth user input "what about tomorrow?" by associating the input with the task of responding to "Can you expect sunshine in New York City tomorrow?" as the user-initiated task-request occurring within the first conversation thread as the target thread.

The VA 240 causes the mobile device 200 to present both the fourth user input 420 followed by the result 422 of the task in the first selectable-screen 402a', thereby presenting the result 422 in association with the first conversation thread as the target thread that has been elevated to the active thread being displayed on the mobile device 200.

In one or more embodiments, the mobile device 200 presents or displays the selectable-screens 402a'-402b in a carousel configuration. The carousel configuration includes a set of selectable-screens, and GUI 401 can transition sequentially through all selectable-screens in the set with only one selectable-screen (or only a few of the selectable-screens) visible to the user at any given point in time. For example, a user input (e.g., swipe left or left-arrow button actuation) to transition in one direction causes the GUI 401 to transition sequentially from displaying the second selectable-screen 402b to displaying a previous selectable-screen, namely the first selectable-screen 402a'. In the case of three selectable-screens, repeating that user input to transition in the same direction would cause the GUI 401 to transition sequentially from the first selectable-screen 402a' to a third selectable-screen then rotate back to the second selectable-screen 402b'. In the carousel configuration, each selectable-screen in the set includes a button area, including buttons enabling the user to select one selectable-screen to be displayed, according to one embodiment. The button area can include arrows (right and left) for sequentially transitioning through the set of selectable-screens or button-tabs (such as the dots of first visual cue 410 and second visual cue 414) for selecting a specific one of the selectable-screens in the set.

In other embodiments, the mobile device 200 presents or displays the selectable-screens 402a'-402b in a tab configuration. In some embodiments, the mobile device 200 presents or displays the selectable-screens 402a'-402b using a combination of the carousel configuration and tab configuration, as shown in FIG. 4. In both the carousel and tab configurations, the majority of the GUI 401 displays a dialogue or conversation between a user and the VA regarding tasks performed by the VA 240 within the active thread. For example, the dialogue in first selectable-screen 402a' includes a previous response 406 by the VA 240, recent user input 420, and response 422 by the VA 240.

The tab configuration includes a set of selectable-screens, and GUI 401 is able to present only one selectable-screen visible to the user at any given point in time. Each selectable-screen in the set includes a tab area (e.g., button area) that displays a set of multiple button-tabs enabling the user to select one selectable-screen to be displayed, and each respective button-tab corresponds to displaying one respective selectable-screen in the set. For example, the user can actuate the first visual cue 410 as a button-tab that causes the GUI 401 to display the first selectable-screen 402a', and the user can actuate the second visual cue 414 as a button-tab that causes the GUI 401 to display the second selectable-screen 402b.

Figure 4B:
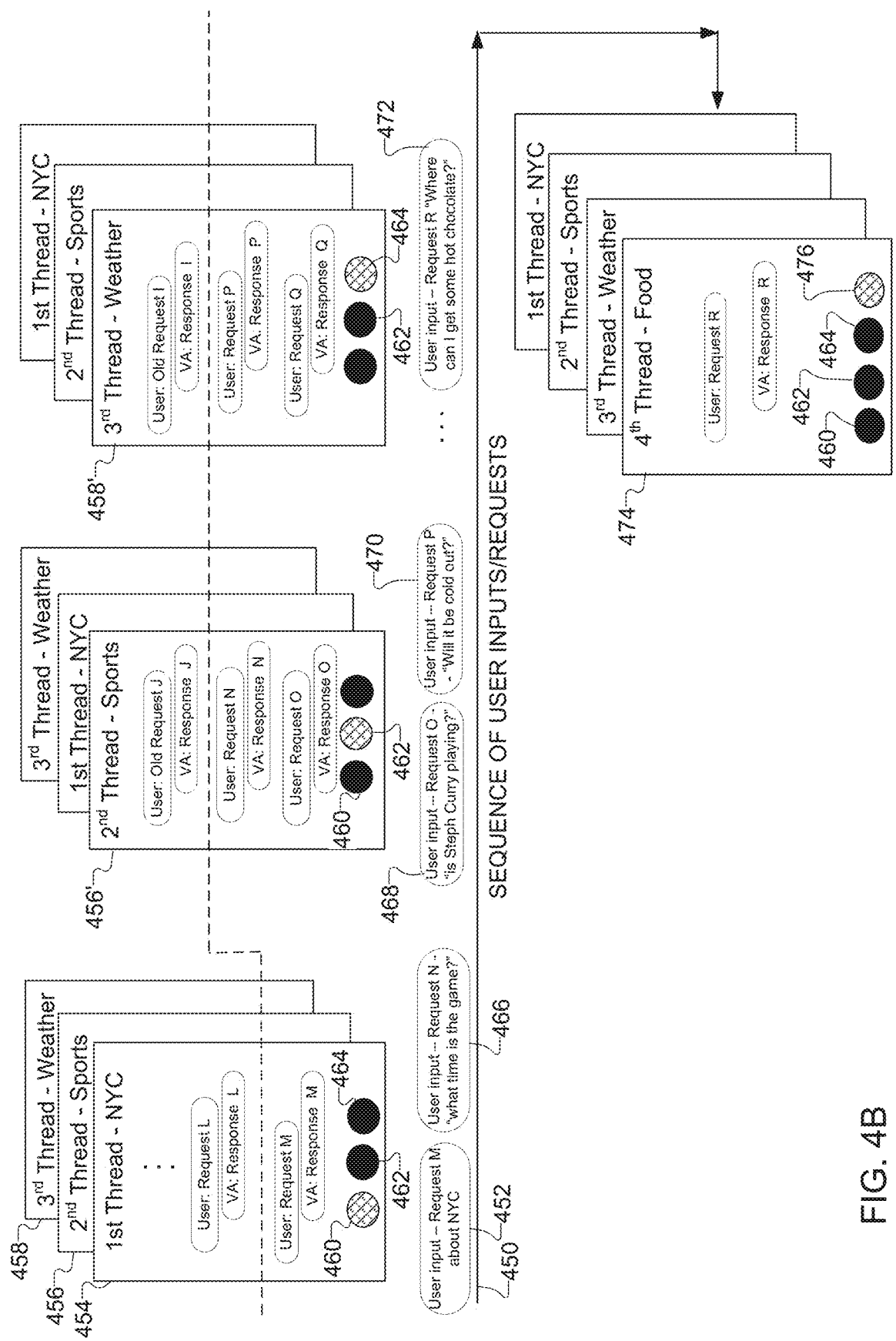

With reference now to FIG. 4B, there is illustrated examples of selectable-screens of a GUI of a mobile device 200. Each selectable-screen displays a dialogue between a user and a VA capable of maintaining conversational context of multiple threads at a time, in accordance with one or more embodiments of this disclosure. The arrow 450 represents a time sequence of user inputs relative to what is displayed via the GUI of the mobile device 200. Beginning at the time the mobile device 200 receives user input—Request M 452, the GUI includes three different screens 454, 456, 458 presenting respectively different threads that are open on the mobile device 200. Previous communications (e.g., User Request L and VA Response L within the first thread, User Request J and VA Response J within the second thread, and User Request I and VA Response I within the third thread) between the user and VA, which occurred before the mobile device 200 received user input—Request M 452, are shown in each screen above the dashed line. According to the time sequence shown, the VA 240 (via mobile device 200) receives inputs/requests M, N, O, P, Q, and R sequentially.

The three different screens 454, 456, 458 are arranged in a stacked configuration, as such, only the dialogue of the thread of the top screen (i.e., the active screen) is visible to the user. Within each of the three different screens 454, 456, 458, icons 460, 462, 464 at bottom of the screen are presented as a part of GUI. The number of displayed icons represents the number of open threads for which the VA maintains contextual information. In one or more embodiments, the icons are presented as different colors with each color representing a different thread status from among active, paused, (and, in one alternate embodiment, closed). In the example shown in FIG. 4B, each status is presented as a different (hash) pattern within the icon, wherein a first pattern (e.g., cross hashed) means active, and a second pattern (e.g., solid black) means paused. In some embodiments, the total number of icons is fixed, with the number representing the number of threads the VA 240 is capable of maintaining open at the same time, and a third pattern (e.g., solid white or a lack of a hash pattern) (not shown) means that no thread has been assigned to the icon or that the previously assigned thread is closed. The top screen corresponds to whichever thread is active at a point in time. For example, when the first screen 454 is the top screen displayed, then the first thread is the active thread, as indicated by the first pattern of the first icon 460. The first screen 454 displays User Request L and VA Response L within the first thread, as well as User Request M and VA Response M. In some embodiments, depending on size, the first screen could display additional user requests/VA responses that are related to the subject matter of the first thread, namely, the subject matter relating to New York City (NYC).

According to the time sequence, after the VA Response M is displayed, yet while the first screen 454 is the top (active) screen, the mobile device 200 receives user input—Request N 466. Without key phrases, the VA 240 can ascertain a task triggering the VA 240 to switch threads based on analyzing the content of user input—Request N 466 and identifying dissimilarity from the subject matter of the active thread (i.e., the first thread) presented via the mobile device 200. More particularly, the VA 240 can comparatively identify that the content (e.g., "what time is the game?") of user input—Request N 466 is dissimilar from the subject matter of the first thread (NYC). The VA 240 thus appreciates that the newly received request has to be associated with another thread or a new thread, triggering a switch from the current active thread.

In response to ascertaining the task triggering the VA to switch threads, the VA 240 identifies a target thread to which user input—Request N 466 is associated. In identifying a target thread, the VA 240 can identify (e.g., by using key words/phrases) whether the content (e.g., "what time is the game?") of user input—Request N 466 is similar to the subject matter of any of the remaining open threads, namely, the subject matter (Sports) of the second thread or the subject matter (Weather) of the third thread. In the example shown, the VA 240 determines that the second thread is the target thread based on identifying that the content of user input—Request N 466 is similar to the subject matter of the second thread, considering that a game is played in sports.

The VA 240 performs the task of switching threads by placing the active thread/first thread in a paused state and changing the screens such that the second screen 456' is the top screen, thereby changing the second thread be the active thread. When the second screen 456' is the top screen displayed, then the second thread is the active thread, as indicated by the changed pattern of the second icon 460 from the second pattern (solid black) to the first pattern (cross hashed). The second screen 456' displays User Request J and VA Response J within the second thread, as well as User Request N and VA Response N. According to the time sequence, after the VA Response N is displayed, yet while the second screen 456' is the top screen, the mobile device 200 receives user input—Request O 468. The second screen 456' additionally displays User Request O and VA Response O as they are related to the subject matter of the second thread. More particularly, the VA 240 identifies that the content ("is Steph Curry playing?") of user input—Request O 468 is similar to the subject matter (Sports) of the second thread. Based on the identified similarity, the VA 240 determines that the second thread is the target thread to which user input—Request O 468 is associated. The VA 240 determines there is no need to switch threads and continues displaying the second screen 456' thread on top, based on detecting that the target thread is the same as the active thread.

According to the time sequence, after the VA Response O is displayed, yet while the second screen 456' is the top screen, the mobile device 200 receives user input—Request P 470. The VA 240 ascertains that the user input triggers the VA 240 to switch threads based on identifying that the content (e.g., "Will it be cold out?") of user input—Request P 470 is dissimilar from the subject matter (Sports) of the active thread (second thread). The VA 240 determines the third thread to be the target thread to which user input—Request P 470 is associated, based on identifying that the content of user input—Request P 470 is similar to the subject matter (Weather) of the third thread.

The VA 240 performs the task of switching threads by placing the active thread/second thread in a paused state and changing the screens such that the third screen 458' is the top screen, thereby changing the third thread be the active thread. When the third screen 458' is the top screen displayed, then the third thread is the active thread, as indicated by the changed pattern of the third icon 464 from the second pattern (solid black) to the first-pattern (cross hashed). Additionally, the icon corresponding to the second screen is changed to the second pattern (solid black) indicating that the associated thread has been paused. The third screen 458' displays User Request I and VA Response I within the third thread, as well as User Request P and VA Response P. The third screen 458' additionally displays User Request Q and VA Response Q, which have content similar to the subject matter of Weather of the third thread, and which are received sequentially after VA Response P.

According to the time sequence, after the VA Response Q is displayed, yet while the third screen 458' is the top screen, the mobile device 200 receives user input—Request R 472. The VA 240 ascertains a task triggering the VA 240 to switch threads based on identifying that the content (e.g., "Where can I get some hot chocolate?") of user input—Request R 472 is dissimilar from the subject matter (Weather) of the active thread (third thread). The VA 240, based on identifying that the content of user input—Request R 472 dissimilar from the subject matter(s) of remainder of the open threads (i.e., first thread and second thread), responds by opening a fourth thread to respond to user input—Request R 472. In some embodiments, the task of switching threads or the task of starting a new thread can be performed as a function executed in the background.

The VA 240 performs the task of starting a new thread by placing the active thread/third thread in a paused state and changing the screens such that a newly generated fourth screen 474 is the top screen, thereby causing the new fourth thread be the active thread. When the fourth screen 474 is the top screen displayed, then the fourth thread is the active thread. Concurrently with opening a new fourth thread, the background VA application updates the GUI to display a fourth icon 476, which is also assigned the first pattern (cross hashed) as the active thread. The fourth screen 474 displays User Request R and VA Response R within the fourth thread. As a newly generated screen corresponding to a newly started thread, the fourth screen 474 does not include any previous dialogue between the user and VA.

Notably, in alternate embodiments, where only three threads can be supported at one time, opening of the fourth thread triggers the closing of one of the previous threads. In one embodiment, where the VA automates the opening and closure of threads, the thread that was least current among the existing threads is automatically closed. In another embodiment, the VA application prompts the user to select which thread to close prior to closing a thread. This embodiment enables the user to decide for which threads the user desires the VA application to keep the contextual information.

Figure 5:
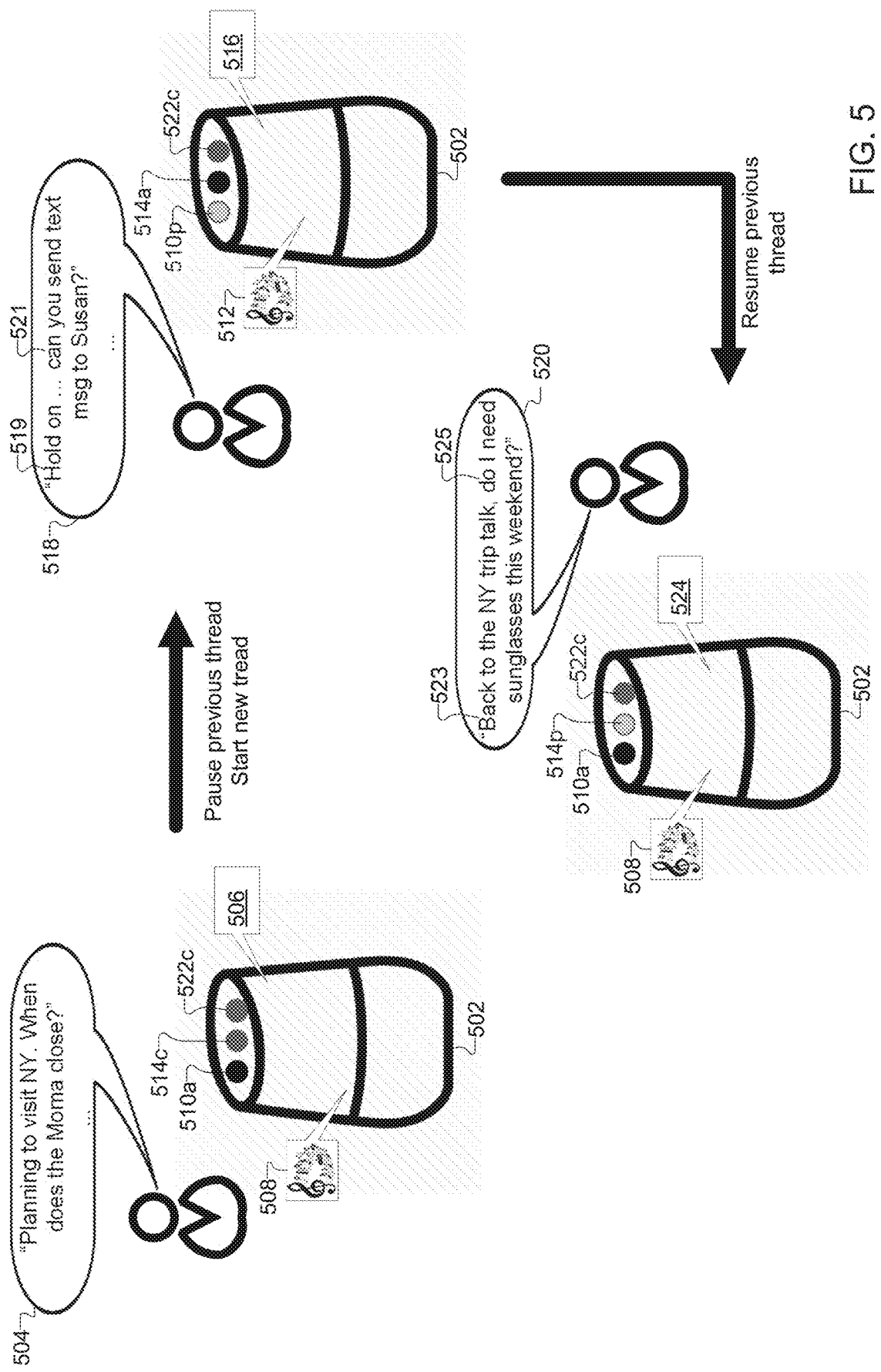
FIG. 5 illustrates examples of human detectable cues output by an electronic device providing functionality of a VA capable of maintaining conversational context of multiple threads at a time, in accordance with one or more embodiments of this disclosure.

With reference now to FIG. 5, there are illustrated examples of human detectable cues (namely, visual indicators 510 (illustrated as 510*a*, 510*p*), 514 (illustrated as 514*a*, 514*c*, 514*p*), 522 (illustrated as 522*c*) output by an electronic device 502 providing functionality of a VA 140 capable of maintaining conversational context of multiple threads at a time, in accordance with one or more embodiments of this disclosure. The embodiment of electronic device 502 illustrated in FIG. 5 is for illustration only and could include the same or similar configuration and components as DPS 100 of FIG. 1.

The user interface of electronic device 502 includes the set of visual indicators 510, 514, 522, the speaker or output device 134 that outputs audio cues, and the microphone or input device 132 that receives user input. The electronic device 502 includes one visual indicator per conversation for which the VA 140 is capable of maintaining conversational context at a time. In the example, shown, the electronic device 502 includes three visual indicators 510, 514, 522, respectively corresponding to the dialogue status of first, second, and third conversation threads for which the VA 140 can simultaneously maintain conversational context. For example, each of the visual indicators 510, 514, 522 can be a light emitting diode (LED).

The VA 140 can control each LED to illuminate differently to indicate a dialogue status of a conversation thread between the user and VA. For example, the first visual indicator 510 remains OFF while no first conversation thread exists between the user and VA. The VA causes the first visual indicator 510 to be ON while the VA 140 maintains contextual information corresponding to the first conversation thread.

In addition to the ON or OFF states of visual indicators 510, 514, 522 (i.e., human-detectable cue) as an indicator of whether contextual information of the thread is kept or discarded, the characteristics (e.g., color, shape, flashing) of the visual indicators 510, 514, 522 indicate whether the VA is in or out of that particular conversation thread. For example, the VA 140 causes the first visual indicator 510 to illuminate as a first color (e.g., yellow or green) to indicate that the VA is in the first conversation thread as the active thread. In certain embodiments, when a particular thread is the "active thread," the VA 140 is answering or listening for user input associated with that particular thread. The VA 140 causes the first visual indicator 510 to illuminate as a second color (e.g., light grey or red) to indicate the paused state of the first conversation thread. When the first thread is in the paused state, the first thread is not the active thread, but instead, another thread (i.e., second thread or third thread) is the active thread.

In certain embodiments, the electronic device 502 outputs an audio cue as a human detectable indicator of which thread among first, second, and third threads is the active thread. The electronic device 502 can output the audio cue in addition to outputting the visual indicators 510, 514, 522. The electronic device 502 outputs the audio cue through an output device 134 (i.e., speaker). The audio cue can be background music or other background sound played while the VA is in a particular conversation thread. For example, the electronic device 502 can output (i.e., playback) a first audio cue 508 when the first conversation thread is the active thread, a second audio cue 512 when the second conversation thread is the active thread, and a third audio cue when the third conversation thread is the active thread. The first audio cue 508, second audio cue 512, and third audio cue are different from each other, such as three different songs, or three different sounds. As background sounds or music, an audio cue (e.g., first audio cue 508, second audio cue 512, or third audio cue) can be outputted by the electronic device 502 while the electronic device 502 outputs a response (e.g., responses 506, 516, 524), such that both the audio cue and the response can be distinctly heard by the ears of the user. In this scenario, the response (e.g., responses 506, 516, 524) is dominant and presented as a voiceover the background audio cue.

In the example shown, a conversational dialogue between the user and the VA begins with a first user input 504, in which the user states "Planning to visit NY. When does the MOMA close?" For example, the user input 504 is received through the input device 132 (e.g., microphone) as audio data (e.g., voice signal). The VA processes the user input 504 to determine one or more user-initiated task-requests. From the statement "Planning to visit NY," the VA 140 ascertains the subject matter of the first conversation thread and determines a user-initiated task-request to start the first thread. From the statement "When does the MOMA close," the VA 140 determines another user-initiated task-request (e.g., "What are today's operating hours for the Museum of Modern Art in New York City?").

Based on the user-initiated task-request, the VA 140 determines a "target thread" to which the user input 504 is associated. The VA 140 determines that both user-initiated task-requests from the user input 504 are associated with the first thread as the target thread, based on the first thread being the only thread or based on a determination that both user-initiated task-requests have the same subject matter (e.g., location as New York). In this example, two user-initiated task-requests having the same subject matter were determined from the user input 504, and consequently, the conversation dialogue between the user and VA includes only one conversation thread at this instance, namely, the first conversation thread.

The VA 140 identifies the first conversation thread as the active thread. More particularly, when the dialogue between the user and VA includes only one conversation thread, then that conversation thread is the active thread (i.e., the thread which the VA 140 is currently answering or listening on for associated user input). Accordingly, the VA 140 illuminates the first visual indicator 510*a* in the first color that indicates the dialog status of the first thread as the active thread (as indicated by the letter "a"), and the VA 140 plays the first audio indicator 508. Also, the second visual indicator 514*c* and the third visual indicator 522*c* remain OFF, which indicates the dialogue status of the first and third threads as closed (as indicated by the letter "c") or not-started.

The VA 140 accesses a data source and generates a response to the user-initiated task-request, which was determined based on the user input 504. In the example shown, the electronic device 502 generates the response 506 by performing the same or similar operations that the mobile device 200 performed to generate the corresponding response 406 presented in FIG. 4A, as described above. The electronic device 502 outputs the response 506 through an output device 134 (i.e., speaker) by reading out the information to the user. More particularly, the output device 134 outputs the response 506 as human audible information, for example "The Museum of Modern Art on West 53$^{rd}$ Street, New York is open today, from 10:30 a.m. to 5:30 p.m. Features include works from van Gogh to Warhol and beyond, plus a sculpture garden, 2 cafes and the Modern restaurant."

After outputting the response 506, the conversational dialogue between the user and the VA continues with second user input 518, in which the user states "Hold on . . . can you send text message to Susan?" The electronic device 502 receives second user input 518 through the input device 132.

The VA 140 processes the second user input 518 to determine one or more user-initiated task-requests. Natural language processing may include matching one or more parts of the second user input 518 to key phrases or to predetermined tasks (e.g., "Send text message," "Add a reminder," and the like) to ascertain the subject matter of the task. The natural language processing may yield multiple subject matters or multiple user-initiated task-requests from the second user input 518, and in response, the VA 140 divides the second user input 518 according to the quantity of user-initiated task-requests. For example, from processing the statement "Hold on . . . " the VA 140 matches the statement to a user-initiated task-request that triggers the VA 140 to place the active thread (i.e., the first thread) in a paused state. From processing the statement "can you send text message to Susan," the VA 140 matches the statement to another user-initiated task-request that triggers the VA 140 to create and send a short message service (SMS) message.

In response to determining two task-requests, the VA 140 divides the second user input 518 into a first sub-input 519 including the statement "Hold on . . . " and a second sub-input 521 including the statement "can you send text message to Susan?" The VA 140 determines the target thread to which the first sub-input 519 is associated.

In some embodiments, the user input may include a combination of a new task as well as a thread finisher key phrase, for example "Finish the talk about visiting NY and add a calendar event." In this example, the user input corresponds to the task for switching threads since the user input includes content associated with both closing the target thread and activating another thread. In response to receiving the user input that corresponds to both closing the target thread and activating another thread, the VA 140 determines whether to maintain or to discard contextual information of previous tasks of the target thread based on content of the received user input. For example, in response to receiving the user input "Finish the talk about visiting NY and add a calendar event," the VA 140 discards contextual information of previous tasks of the target thread (having subject matter "visiting NY") and starts a new thread for generating a response to "add a calendar event."

When a task-request includes a first sub-input to place the active thread in a paused state is received, the request can additionally trigger the VA 140 to either (i) start a new thread, or (ii) perform the task of switching threads. More particularly, when the task request includes the first sub-input 519 and is received while the VA 140 stores contextual information for only the active thread (i.e., only the first thread), then the task-request to place the active thread in a paused state triggers the VA 140 to automatically (i.e., without human intervention) start a new thread (such as a second thread) and to automatically activate the new thread as the target thread to which the next task-request is associated. The VA 140 first determines that the first thread is the target thread to which the first sub-input 519 is associated. Accordingly, the VA 140 performs the task of placing the active thread (i.e., the first thread) in a paused state. Also, the VA 140 automatically starts the second thread as the new thread, and automatically makes the second thread the target thread to which the second sub-input 521 is associated. At this instance, the VA 140 maintains contextual information for multiple threads—the first conversation thread and the second conversation thread.

Within the second thread as both the target thread and active thread, the VA 140 performs the task of creating and sending a text message to Susan. For example, the task of creating an SMS message may include populating a set of fields including a destination/recipient field and an SMS body field.

The VA 140 illuminates the first visual indicator 510*p* in the second color indicating the dialogue status of the first conversation thread as "paused" (as indicated by the letter "p"). The VA 140 illuminates the second visual indicator 514*a* in the first color indicating the dialog status of the second thread as the active thread, and VA 140 plays the second audio indicator 512 in the background. The third visual indicator 522*c* remains OFF indicating that no third thread has been activate and/or that the dialogue status of the third thread as closed.

In some embodiments, if the second user input 518 (i.e., containing first sub-input 519 as the basis for the task-request to place the active/first thread in a paused state) is received while the VA 140 stores contextual information for multiple threads (such as the first and second threads), then the VA 140 compares the subject matter (i.e., text message to Susan) of the second sub-input 521 with the subject matter of the paused threads (for example, the second thread having the subject matter of a text message to Susan). The VA 140 determines to switch to the second thread based on similarities in the comparison or to start a new conversation thread (such as a third thread) based on differences in the comparison.

In the example shown, the VA 140 can generate the response 516 by prompting the user to provide additional information corresponding to an empty SMS body field. For example, the electronic device 502 outputs the response 516 (for example, "What do you want to say to Susan?") through the output device 134 (i.e., speaker) by reading out the prompt to the user. In certain embodiments, the electronic device 502 plays the second audio cue 512 while listening for the user to answer the response 516. The second audio cue 512 enables the user to know that the VA 140 is listening for additional information corresponding to the subject matter of the second thread.

On the other hand, if the first sub-input 519 is received while the VA 140 stores contextual information for multiple threads (such as the first and second threads), then the user-initiated task-request to place the active thread in a paused state triggers the VA 140 to (i) identify which of the other paused threads is the target thread of the second sub-input 521, based on the received second sub-input 521 (ii) automatically switch to the target thread of the second sub-input 521 (i.e., another thread that is not the active thread), and (iii) perform the next task in the switched-to other thread, which has now become the active thread. When the content of the received user input (i.e., second sub-input 521) does not identify a specific other paused thread as the target thread of the second sub-input 521, then the performance of the next task occurs within either a new thread (such as a third thread). To make this switch to another one of the available threads, the VA 140 determines one target thread to which the next user-initiated task-request (e.g., based on second sub-input 521) is associated. The VA 140 can determine a respective target thread for the first and second sub-inputs 519-521 in parallel (i.e., concurrently), or alternatively, in a sequential manner. In the presented examples, the VA 140 determines the second thread to be the target thread to which the second sub-input 521 is associated, based on the second sub-input 521 containing content (having subject matter of creating an SMS message) that is similar to the subject matter (i.e., "text message to Susan") of the second thread. Accordingly, the VA 140 performs the task of creating and sending a text message to Susan within the second thread as the target thread to which second sub-input 521 is associated.

The conversational dialogue between the user and the VA 140 continues with third user input 520, in which the user states "Back to the NY trip talk, do I need sunglasses this weekend?" The electronic device 502 receives third user input 520 through the input device 132.

The VA 140 processes the second user input 518 to determine one or more user-initiated task-requests. From processing the statement "Back to the NY trip talk," the VA 140 determines a user-initiated task-request to switch to the first thread. From processing the statement "do I need sunglasses this weekend," the VA 140 identifies another user-initiated task-request (e.g., "Can you expect sunshine in New York City on Friday, Saturday, or Sunday?"). In response to determining two task-requests, the VA 140 divides the third user input 520 into a third sub-input 523 including the statement "Back to the NY trip talk," and a fourth sub-input 525 including the statement "do I need sunglasses this weekend?"

The VA 140 identifies the second thread as the target thread to which the third sub-input 523 is associated, based on a matching the content (e.g., "Back to the NY trip talk" of the third sub-input 523 to key phrases (e.g., "Back to . . . ") for a predetermined task of switching threads. In response to receiving a user input that indicates to the VA 140 that the task includes switching threads, the VA 140 performs the switching of the threads and performs the next task in another thread. When the content of the received user input identifies a specific other thread, the performance of the next task occurs within the identified specific other thread. When the user mistakenly requests a task of switching from the active thread to the same active thread, the VA 140 recognizes that no switching of threads is required and refrains from changing the status of the active thread. In response to recognizing that no switching of threads is required, the VA 140 can prompt the user to confirm which thread the user intends to switch to. In the example shown, the content (i.e., "NY trip") of the third sub-input 523 identifies the first thread by containing similarities in comparison with the first thread's subject matter (i.e., "visit NY.") Accordingly, the task of switching threads includes switching from the second thread to the first thread, and the VA 140 establishes that the performance of the next task will be within the identified specific other thread, namely, the first thread. More particularly, the VA 140 determines the first thread as the target thread to which the fourth sub-input 525 is associated, and establishes that the task of responding to "Can you expect sunshine in New York City on Friday, Saturday, or Sunday?" will occur within the first conversation thread as the target thread.

With the second thread as both the target thread and active thread, the VA 140 performs the task of placing the active thread in a paused state. In response to the active thread being placed in the paused state, the VA 140 changes the second visual indicator 514p to the second color indicating that the second conversation thread has the dialogue status of "paused" (as indicated by the letter "p") of. The VA 140 changes the first visual indicator 510a in the first color to indicate the dialog status of and/or the first thread as the active thread, and the VA 140 plays the first audio indicator 508 in the background. The third visual indicator 522c remains OFF indicating the dialogue status of the third thread as closed.

Within the first thread executing as the active thread, the VA 140 generates a response to the user-initiated task-request (e.g., "Can you expect sunshine in New York City on Friday, Saturday, or Sunday?"), determined based on the fourth sub-input 525, by accessing a data source. In the example shown, the electronic device 502 generates the response 524 by performing similar operations as performed in the generation of the corresponding response 406 presented in the GUI 401 of FIG. 4A, as described above. The electronic device 502 outputs the response 524 through an output device 134 (i.e., speaker) by reading out the information to the user. More particularly, the output device 134 outputs the response 524 as human audible information, for example "It won't be sunny, just partly cloudy this weekend in New York City, N.Y. Friday will be partly cloudy with a high of 72° F. and a low of 61° F. Saturday will be partly cloudy with a high of 60° F. and a low of 55° F. Sunday will be cloudy with a high of 65° F. and a low of 62° F."

On the other hand, if the third sub-input 523 is received while the VA 140 stores contextual information for multiple threads (such as the first and second threads), then the task-request to switch threads triggers the VA 140 to (i) identify another thread that is currently paused or generate a new thread as the target thread of the fourth sub-input 525, (ii) automatically switch to the other thread that is the target thread of the fourth sub-input 525, and (ii) perform the next task in the switched-to other thread, which is now the active thread. When the content of the received user input (i.e., third sub-input 523) does not identify a specific other thread (i.e., the switched-to other thread), then the performance of the next task (i.e., for which the fourth sub-input 525 is the basis) occurs within a new thread, such as a third thread, that is initiated by the VA 140. When the content of the received user input identifies an already active thread as the thread to be switched-to, the VA 140 recognizes the user error and refrains from switching threads. In response to recognizing that no switching of threads is required, the VA 140 can prompt the user to confirm which thread the user intends to switch to.

Figure 6A:
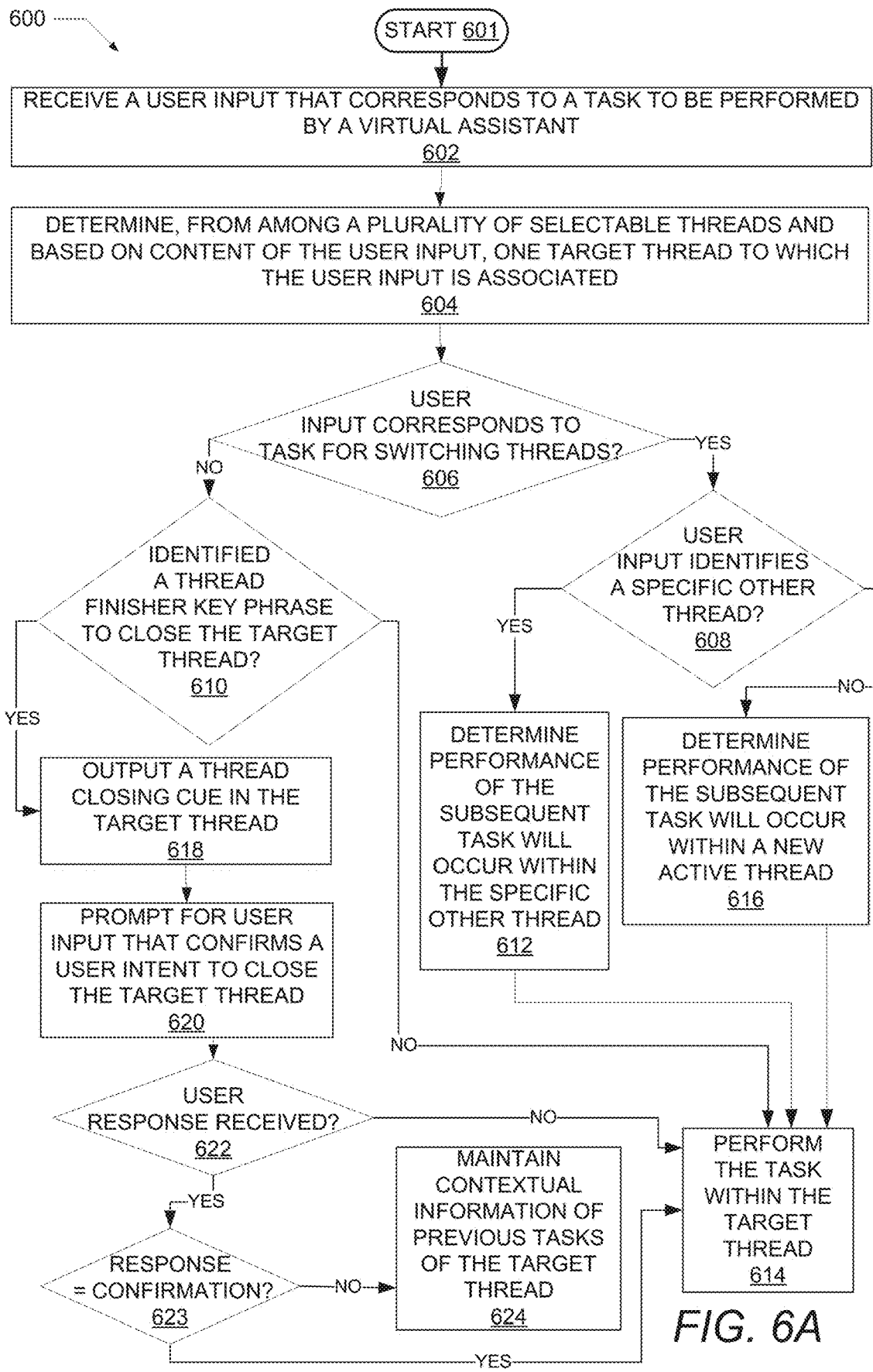
FIG. 6 (6A and 6B) provides a flow chart illustrating a method for indicating a dialogue status of a conversation thread between a user and a VA capable of maintaining conversational context of multiple threads at a time and for controlling the dialogue based on a dialogue status indicator, in accordance with one or more embodiments of this disclosure.

With reference now to FIG. 6, there is illustrated a flow chart illustrating a method for indicating a dialogue status of a conversation thread between a user of an electronic device and a VA capable of maintaining conversational context of multiple threads at a time and for controlling the dialogue based on the dialogue status indicator, in accordance with one or more embodiments of this disclosure. Aspects of the method are described with reference to the components of FIGS. 1 and 2. Several of the processes of the method provided in FIG. 6 can be implemented by a processor (e.g., CPU 104) executing software code of VA 140 within a data processing system (e.g., DPS 100 or electronic device 502). In another embodiment, several of the processes of the method provided in FIG. 6 can be implemented by a processor executing software code of VA 240 within a mobile device (e.g., mobile device 200). The method processes described in FIG. 6 are generally described as being performed by VA 140 which uses other components of DPS 100. Also, the method processes described in FIG. 6 are generally described as though the phrase "user-initiated task-request" is interchangeable with the phrase "user input."

Method 600 commences at initiator block 601 then proceeds to block 602. The example of method 600 starts with at least one thread that is active. At block 602, the VA 140 receives (via input device 132) a user input that corresponds to a task to be performed by a VA 140, 240. At block 604, the VA 140 determines one target thread to which the user input is associated. More particularly, VA 140 determines the one thread from among a plurality of selectable threads and based on content of the user input. Note that determining one target thread to which the user input is associated may include transmitting the user input to server 150 for automatic speech recognition and/or natural language processing. At block 606, in response to receiving a user input that indicates to the VA 140 that the task includes switching threads, the VA 140 determines whether to maintain or to discard contextual information of previous tasks of the target thread based on content of the received user input.

After the VA 140 determines that the user input indicates to the VA 140 that the task to be performed by the VA includes switching threads, the VA 140 determines, at block 608, whether the content of the received user input identifies a specific other thread. After VA 140 determines that the user input indicates to the VA 140 that the task to be performed by the VA does not include switching threads, the VA 140 determines, at block 610, whether the content of the user input includes a thread finisher key phrase that indicates to the VA 140 that the task includes closing the target thread—meaning the VA 140 discards contextual information of previous task(s) of the target thread.

In response to identifying a specific other thread in the content of the user input, VA 140 determines, at block 612, that performance of a subsequent (e.g., next) task will occur within the identified specific other thread. More particularly, at block 612, the CPU 104 establishes that the task of switching threads will be performed within the target thread at block 614 and that the subsequent task will occur within the identified specific other thread. That is, at block 614 VA 140 performs the first task within the target thread. Note that performing the task within the target thread may include transmitting the user input to the server 150 for receiving a response to one or more user-initiated task-requests derived from the user input. For example, as shown in FIG. 5, the VA 140 performs the task of switching threads within the second thread (i.e., target thread to which the third sub-input 523 is associated). Performance of the task of switching threads includes deactivating the second thread and activating the first thread (i.e., specific other thread identified in the content of the third sub-input 523) as the active thread. The VA 140 determines that the task of generating a response to "Can you expect sunshine in New York City on Friday, Saturday, or Sunday?" will occur within the first thread.

In response to determining that the content of the user input does not identify a specific other thread, VA 140 determines, at block 616, that performance of the subsequent task will occur with a new active thread. More particularly, at block 616, the VA 140 determines that the task of switching threads will be performed within the target thread at block 614 and that the subsequent task will occur within the new active thread. For example, referring to FIG. 5, if the conversational dialogue between the user and the VA 140 continued with third user input 520, in which the user stated "Pause . . . add a reminder to make birthday party shopping list on Wednesday," then the VA 140 would perform the task of switching threads within the second thread. Considering the second thread as the target thread to which the sub-input "Pause . . . " is associated, the VA 140 would deactivate the second thread and activate the third thread (i.e., new thread) as the active thread. Also, VA 140 would determine that the task of generating a response to "add a reminder to make birthday party shopping list on Wednesday" will occur within the third thread.

In response to determining, at block 610, that the content of the user input does not identify a thread finisher key phrase, the VA 140 determines that the task of closing the target thread will be performed within the target thread at block 614. In response to identifying, at block 610, a thread finisher key phrase in the content of the user input, DPS 100 outputs, at block 618, a thread closing cue that indicates to a user that the VA 140 will close the target thread. Examples of the thread closing cue include (i) a text message bubble that states "The VA will close this conversation thread after 3 seconds" or (ii) human audible information output by the output device 134. Examples of human audible information of the thread closing cue include a background sound played for a closing period of time (e.g., 3 seconds), or a voiceover that states "The VA will close this conversation thread after 3 seconds."

At block 620, VA 140 prompts for a user input that confirms a user-intent to close the target thread. For example, when the VA 140 is about to lose or discard the contextual information of previous user-initiated task-requests of the target thread, the output device 134 outputs a message "Are we done?" or "Are we done talking about this?" At block 622, the VA 140 checks whether input device 132 received a user input in response to the prompt. If no user input is received prior to the expiration of the pre-set time period (e.g., 3 seconds), then the VA 140 closes the thread and discards or archives the contextual information of the thread (block 614). In response to receiving a user input, VA 140 determines at block 623 whether the user input confirms the user's intent to close the target thread.

In response to receiving, at block 623, a user input confirming the user-intent to close the target thread, the VA 140, at block 614, closes the target thread and discards contextual information of previous tasks of the target thread. In response to receiving, at block 623, a user input indicating the user's intent to maintain the target thread, the VA 140, 240, at block 624, maintains contextual information of previous tasks of the target thread.

Figure 6B:
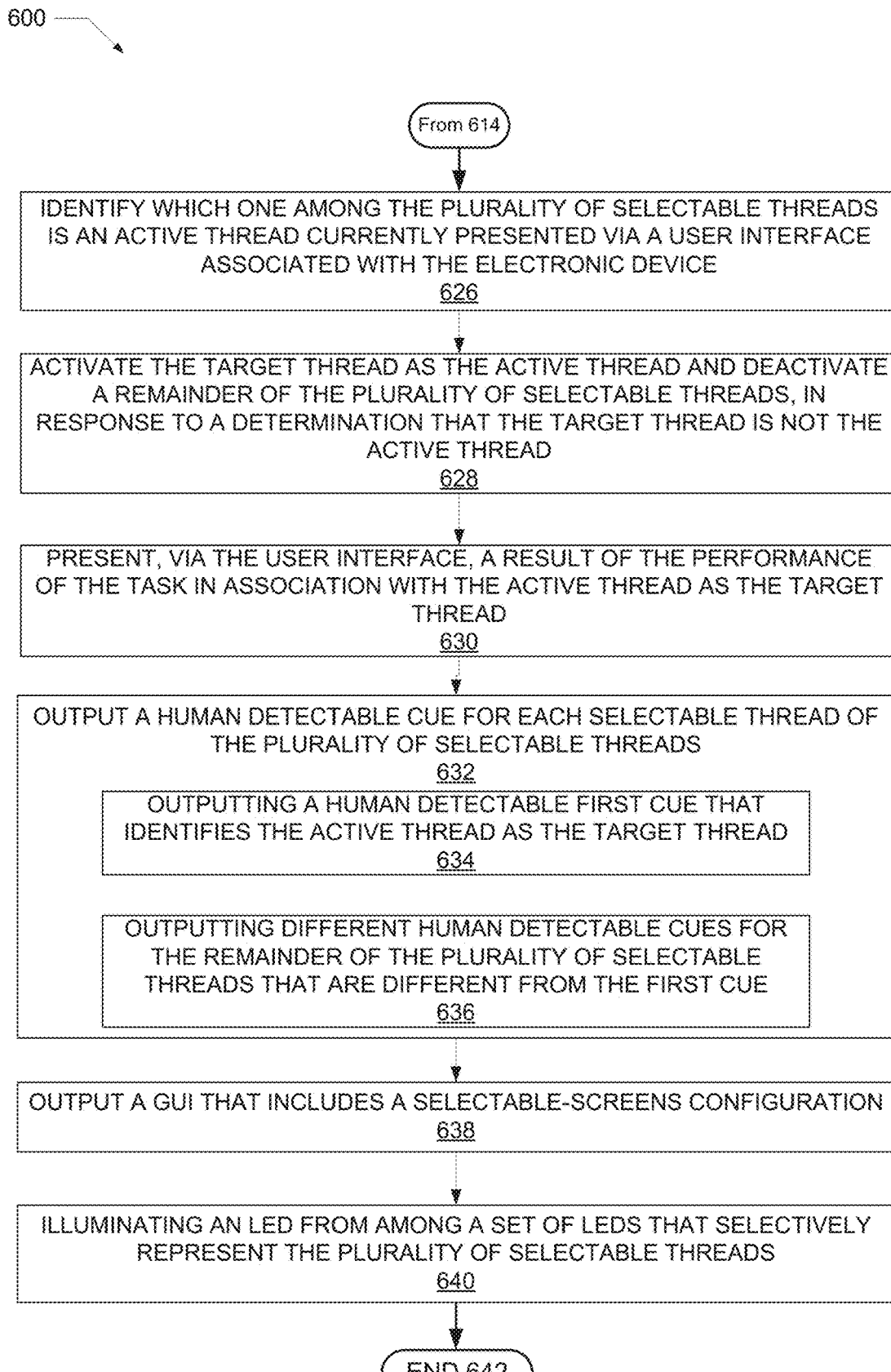

With reference now to FIG. 6B, at block 626, the VA 140 identifies which one among the plurality of selectable threads is an active thread currently presented via a user interface associated with the electronic device (e.g., DPS 100). More particularly, the VA 140 identifies which thread has the status of being the "active thread." At block 628, the VA 140, in response to a determination that the target thread is not the active thread, deactivates the active thread and activates the target thread to then be the active thread. At block 630, the VA 140 presents, via the user interface, a result of the performance of the task in association with the active thread as the target thread. Example results of the performance of a task include the responses 406, 422 and result 416 of FIG. 4A, and the responses 506, 516, 524 of FIG. 5. At block 632, VA 140 (via output device 134) outputs a human detectable cue for each selectable thread of the plurality of selectable threads. For example, as shown in FIG. 5, the set of visual indicators 510, 514, 522 outputs one illuminated LED for each selectable thread, wherein each LED is a human detectable visual cue. As another example, the speaker of the output device 134 outputs one human detectable audio cue (e.g., first audio cue 508, second audio cue 512, or third audio cue) for each selectable thread.

In certain embodiments, the output device 134 outputs a human detectable cue for each selectable thread of the plurality of selectable threads. Specifically, at block 634, VA 140 (via output device 134) outputs a human detectable first cue that identifies the active thread. Additionally, the output device 134 outputs, at block 636, different human detectable cues for the remainder of the plurality of selectable threads that are different from the human detectable first cue. For example, as shown in second selectable-screen 402b of FIG. 5, the first cue identifies the active thread, which is the second visual indicator 514a that is presented as a yellow LED. The remainder of the plurality of selectable threads (i.e., the first thread) is/are represented by different cue(s) (i.e., first visual indicator 510p) that are presented as a gray LED.

At block 638, VA 140 (via output device 134) outputs, on a display, a GUI that includes a selectable-screens configuration. The selectable-screens configuration includes a set of display screens for each respective thread of the plurality of selectable threads, wherein a first display screen of the set displays the first cue, the different cues, and a conversation between a user and the VA regarding the task performed within the active thread. At block 640, VA 140 (via output device 134) illuminates an LED from among a set of LEDs that selectively represent the plurality of selectable threads. Additionally, each LED that is associated with a closed/non-selectable conversation thread remains OFF. The method 600 terminates at block 642.

Figure 7:
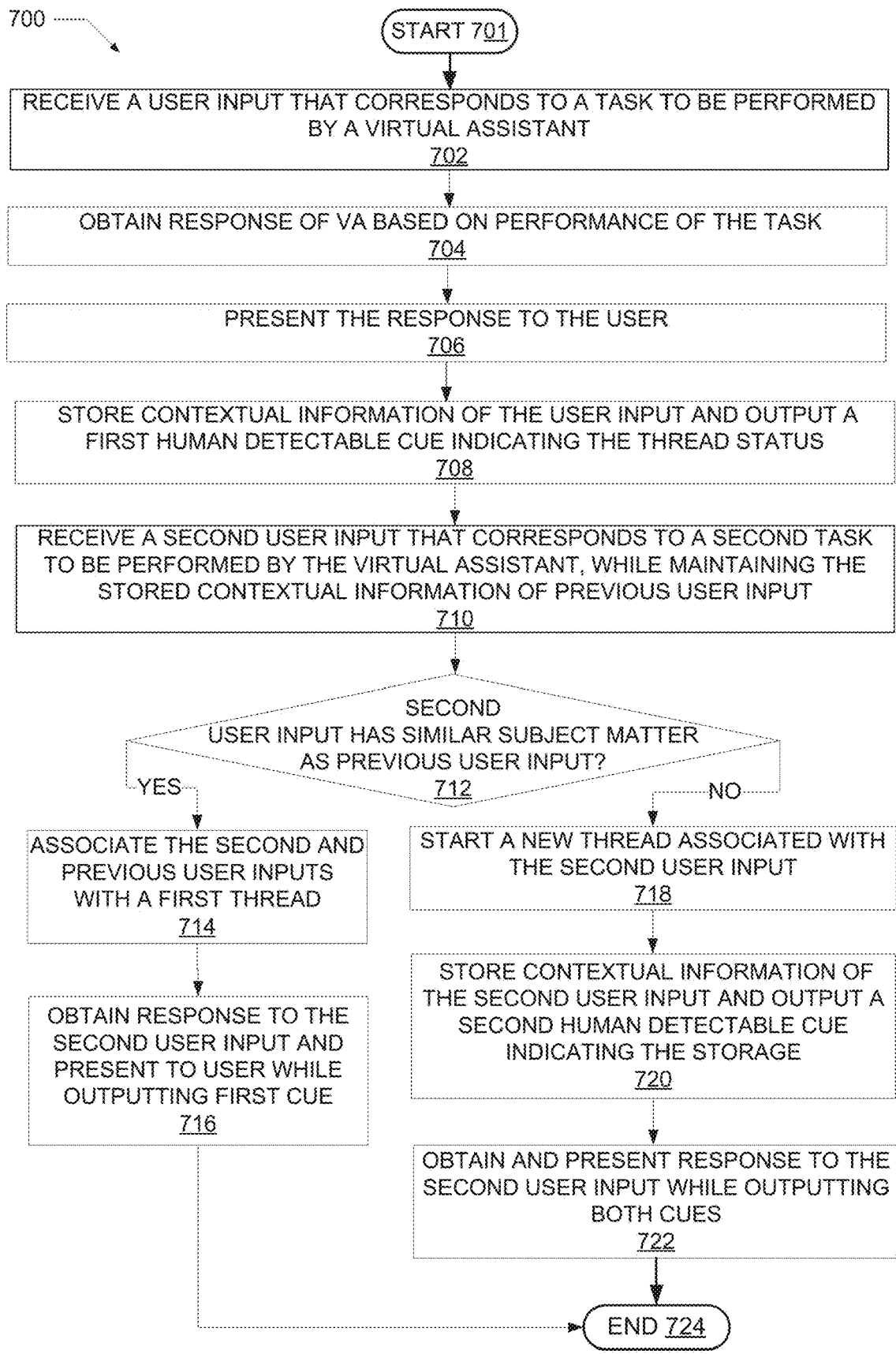
FIG. 7 provides a flow chart illustrating a method for establishing multiple conversation threads in a communication session between a user and a VA, in accordance with one or more embodiments of this disclosure.

With reference now to FIG. 7, there is illustrated a flow chart illustrating a method for establishing multiple conversation threads in a communication session between a user and a VA capable of maintaining conversational context of multiple threads at the same time, in accordance with one or more embodiments of this disclosure. Aspects of the method are described with reference to the components of FIGS. 1 and 2. Several of the processes of the method provided in FIG. 7 can be implemented by a processor (e.g., CPU 104) executing software code of VA 140 within a data processing system (e.g., DPS 100 or electronic device 502). In another embodiment, several of the processes of the method provided in FIG. 7 can be implemented by a processor executing software code of VA 240 within a mobile device (e.g., mobile device 200). The method processes described in FIG. 7 are generally described as being performed by VA 140 of DPS 100. Also, the method processes described in FIG. 7 are generally described as though the phrase "user-initiated task-request" is interchangeable with the phrase "user input."

Method 700 commences at initiator block 701 then proceeds to block 702. At block 701, a communication session is commenced between the user of DPS 100 and the VA. At block 702, VA 140 receives (via input device 132) a user input that corresponds to a first task to be performed by the VA 140. At block 704, VA 140 obtains a response based on performance of the first task. For example, the VA 140 performs the first task requested by the user input and provides the response to DPS 100. At block 706, the output device 134 presents the response to the user. At block 708, VA 140 stores (via system memory 110) contextual information of the user input received at block 702, and VA 140 outputs (via output device 134) a first human detectable cue that is perceptible to the user as a notification/indication that the VA 140 is maintaining storage of contextual information of previously received user input(s). For example, the VA 140 could store contextual information of the user input received at block 702 as well as contextual information of the response received at block 704, and the output device 134 could output first visual cue 410a as shown in first screen 402a of FIG. 4A. At block 710, DPS 100 receives a second user input that corresponds to a second task to be performed by the VA 140, while maintaining contextual information of the previous user input. At block 712, the VA 140 compares subject matter of the previous user input to that of the second user input, and based on the comparison, identifies whether the second user input has a subject matter that is similar to or dissimilar from that of the previous user input. The determination can be based on keyword or key phrase matching, for instance. As an example, comparing subject matters could include comparing content of the previous user input with content of the second user input. In other words, at block 712, based on the comparison, the VA 140 determines a target thread to which the second user input is associated.

At block 714, in response to identifying that the subject matter of the second user input is similar to the subject matter of the previous user input, the VA 140 associates both the previous user input and the second user input with a first conversation thread. At block 716, VA 140 obtains a response to the second task based on performance of the second task by the VA 140, and DPS 100 presents the response to the user in the same conversation thread while the output device 134 continues to output the first human detectable cue.

At block 718, in response to identifying that the subject matter of the second user input is dissimilar from the subject matter of the previous user input, the VA 140 starts a new, second thread associated with the second user input. In certain embodiments, when VA 140 starts the second thread, the VA 140 also places the first thread in a paused state. When a conversation thread is placed in a paused state or closed state, VA 140 causes data of the system memory 110 to be stored in the storage 120. More particularly, VA 140 causes contextual information of the user input corresponding to the paused/closed conversation thread to be stored in system memory 110, where such data can be retrieved later by VA 140 in order to resume the paused/closed conversation thread. At block 720, the VA 140 stores contextual information of the second user input received, without discarding the contextual information of the previous user input stored at block 708, and VA 140 outputs (via output device 134) a second human detectable cue that is perceptible to the user as a notification/indication that the VA 140 is maintaining storage of contextual information of the second user input. More particularly, the VA 140 maintains multiple (e.g., first and second) conversation threads at the same time by concurrently maintaining contextual information of the multiple threads. At block 722, VA 140 obtains a response to the second task based on performance of the second task by the VA 140, and VA 140 presents the response to the second user input to the user via output device 134, while the output device 134 outputs both the first human detectable cue (indicating the first thread is in a paused state) and the second human detectable cue (indicating the second thread is the active thread). For example, the output device 134 could present the result 416 while outputting the first visual cue 410p (in a first color associated with the paused state) and second visual cue 414a (in a second color associated with the active state), as shown in second selectable-screen 402b of FIG. 4A. The method 700 terminates at block 724.

In the above-described flow charts of FIGS. 6 and 7, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
receiving, at an electronic device providing functionality of a virtual assistant (VA), a user input that corresponds to a task to be performed by the VA;
determining, based on content of the user input, one target thread to which the user input is associated from among a plurality of selectable threads;
identifying whether the target thread is a current active thread;
in response to the target thread not being the current active thread: placing the current active thread in a paused state; outputting an indicator that identifies that the VA is maintaining contextual information associated with the current active thread being placed in the paused state; and activating the target thread as a new current active thread; and
performing the task within only the target thread that is the new current active thread.

2. The method of claim 1, further comprising:
identifying which one among the plurality of selectable threads is an active thread currently presented via a user interface associated with the electronic device;
deactivating a remainder of the plurality of selectable threads, in response to a determination that the target thread is not the active thread; and
presenting, via the user interface, the target thread as the active thread and a result of the performance of the task in association with the target thread as the active thread.

3. The method of claim 2, further comprising:
outputting, via an output device, a human detectable cue for each selectable thread of the plurality of selectable threads by:
outputting a human detectable first cue that identifies the active thread as the target thread; and
outputting, for the remainder of the plurality of selectable threads, different human detectable cues that are different from the first cue.

4. The method of claim 3, wherein the human detectable cue for each selectable thread of the plurality of selectable threads includes a visual cue, and
wherein the method further comprises at least one of:
outputting, on a display associated with the electronic device, a graphical user interface (GUI) that includes a selectable-screens configuration, the selectable-screens configuration including a set of display screens for each respective thread of the plurality of selectable threads, wherein a first display screen of the set displays the first cue, the different cues, and a conversation between a user and the VA regarding the task performed within the target thread; or
illuminating a light emitting diode (LED) from among a set of LEDs that selectively represent the plurality of selectable threads.

5. The method of claim 3, wherein the human detectable cue for each selectable thread of the plurality of selectable threads includes an audio cue and the outputting of the human detectable cue comprises outputting, via a speaker associated with the electronic device, a select one of the audio cues corresponding to the active thread.

6. The method of claim 1, further comprising:
identifying, in the content of the user input, a thread finisher key phrase that indicates to the VA that the task includes closing the target thread; and
in response to the identification of the thread finisher key phrase, outputting a thread closing cue that indicates to a user that the VA will close the target thread.

7. The method of claim 6, further comprising:
in response to the identification of the thread finisher key phrase, prompting for a user input that confirms a user-intent to close the target thread; and
in response to the user input confirming the user-intent to close the target thread, closing the target thread and discarding contextual information of previous tasks of the target thread based on receipt of the user input in response to the prompt.

8. The method of claim 1, further comprising:
in response to receiving a user input that indicates to the VA that the task includes switching threads, determining whether to maintain or to discard contextual information of previous tasks of the target thread based on content of the received user input; and
performing the switching of the threads and performing a subsequent task in another thread among a remainder of the plurality of selectable threads,
wherein when the content of the received user input identifies a specific other thread, the performance of the subsequent task is within the specific other thread, and
wherein the performance of the subsequent task is within a new active thread when the content of the received user input does not identify a specific other thread.

9. A data processing system, comprising:
an input device that receives user input;
an output device that outputs human detectable cues; and
a processor, operably coupled to the input device and output device, and which executes program code enabling the data processing system to:
receive, at an electronic device providing functionality of a virtual assistant (VA), a user input that corresponds to a task to be performed by the VA;
determine, from among a plurality of selectable threads and based on content of the user input, one target thread to which the user input is associated;
identify whether the target thread is a current active thread;
in response to the target thread not being the current active thread: place the current active thread in a paused state; output an indicator that identifies that the VA is maintaining contextual information associated with the current active thread being placed in the paused state; and activate the target thread as a new current active thread; and
perform the task within only the target thread activated as the new current active thread.

10. The data processing system of claim 9, wherein the program code further enables the data processing system to:
identify which one among the plurality of selectable threads is an active thread currently presented via a user interface associated with the electronic device;
deactivate a remainder of the plurality of selectable threads, in response to a determination that the target thread is not the active thread; and
present, via the user interface, the target thread as the active thread and a result of the performance of the task in association with the target thread as the active thread.

11. The data processing system of claim 10, wherein the program code further enables the data processing system to:

output a human detectable cue for each selectable thread of the plurality of selectable threads by:
outputting a human detectable first cue that identifies the active thread as the target thread; and
outputting, for a remainder of the plurality of selectable threads, different human detectable cues that are different from the first cue.

12. The data processing system of claim 11, wherein the human detectable cue for each selectable thread of the plurality of selectable threads includes a visual cue, and
wherein the program code further enables the data processing system to perform at least one of:
output, on a display associated with the data processing system, a graphical user interface (GUI) that includes a selectable-screen configuration, the selectable-screen configuration including a set of display screens for each respective thread of the plurality of selectable threads, wherein a first display screen of the set displays the first cue, the different cues, and a conversation between a user and the VA regarding the task performed within the target thread; or
illuminate a light emitting diode (LED) from among a set of LEDs that selectively represents the plurality of selectable threads.

13. The data processing system of claim 9, wherein the program code further enables the data processing system to:
identify, in the content of the user input, a thread finisher key phrase that indicates to the VA that the task includes closing the target thread; and
in response to the identification of the thread finisher key phrase, output a thread closing cue that indicates to a user that the VA will close the target thread.

14. The data processing system of claim 13, further comprising:
in response to the identification of the thread finisher key phrase, prompt for a user input that confirms a user-intent to close the target thread; and
in response to the user input confirming the user-intent to close the target thread, close the target thread and discard contextual information of previous tasks of the target thread based on receipt of the user input in response to the prompt.

15. The data processing system of claim 9, wherein the program code further enables the data processing system to:
in response to receiving a user input that indicates to the VA that the task includes switching threads, determine whether to maintain or to discard contextual information of previous tasks of the target thread based on content of the received user input; and
perform the switching of the threads and performing a subsequent task in another thread among a remainder of the plurality of selectable threads,
wherein when the content of the received user input identifies a specific other thread, the performance of the subsequent task is within the specific other thread, and
wherein the performance of the subsequent task is within a new active thread when the content of the received user input does not identify a specific other thread.

16. A computer program product comprising:
a non-transitory computer readable storage device; and
program code on the computer readable storage device that, when executed by a processor associated with a data processing system, enables the data processing system to provide the functionality of:

receiving, at an electronic device providing functionality of a virtual assistant (VA), a user input that corresponds to a task to be performed by the VA;

determining, from among a plurality of selectable threads and based on content of the user input, one target thread to which the user input is associated;

identifying whether the target thread is a current active thread;

in response to the target thread not being the current active thread: placing the current active thread in a paused state; outputting an indicator that identifies that the VA is maintaining contextual information associated with the current active thread being placed in the paused state; and activating the target thread as a new current active thread; and performing the task within only the target thread that is the new current active thread.

17. The computer program product of claim 16, wherein the program code comprises program code that, when executed by the processor, enables the data processing system to provide the functionality of:

identifying which one among the plurality of selectable threads is an active thread currently presented via a user interface associated with the electronic device;

deactivating a remainder of the plurality of selectable threads, in response to a determination that the target thread is not the active thread; and presenting, via the user interface, the target thread as the active thread and a result of the performance of the task in association with the target thread as the active thread.

18. The computer program product of claim 17, wherein the program code comprises program code that, when executed by the processor, enables the data processing system to provide the functionality of:

outputting a human detectable cue for each selectable thread of the plurality of selectable threads by:

outputting a human detectable first cue that identifies the active thread as the target thread; and outputting, for the remainder of the plurality of selectable threads, different human detectable cues that are different from the first cue.

19. The computer program product of claim 18, wherein:

the human detectable cue for each selectable thread of the plurality of selectable threads includes a visual cue; and the program code comprises program code that, when executed by the processor, enables the data processing system to provide at least one of the functionalities of:

outputting, on a display associated with the data processing system, a graphical user interface (GUI) that includes a selectable-screen configuration, the selectable-screen configuration including a set of display screens for each respective thread of the plurality of selectable threads, wherein a first display screen of the set displays the first cue, the different cues, and a conversation between a user and the VA regarding the task performed within the target thread; and illuminating a light emitting diode (LED) from among a set of LEDs that selectively represent the plurality of selectable threads.

20. The computer program product of claim 18, wherein the human detectable cue for each selectable thread of the plurality of selectable threads includes an audio cue and the program code for outputting of the human detectable cue comprises code for outputting, via a speaker associated with the electronic device, a select one of the audio cues corresponding to the active thread.

* * * * *